United States Patent [19]

Guilfoyle

[11] Patent Number: 4,667,300

[45] Date of Patent: May 19, 1987

[54] COMPUTING METHOD AND APPARATUS

[75] Inventor: Peter S. Guilfoyle, Sunnyvale, Calif.

[73] Assignee: Guiltech Research Company, Inc., Sunnyvale, Calif.

[21] Appl. No.: 517,771

[22] Filed: Jul. 27, 1983

[51] Int. Cl.[4] .......................... G06F 7/56; G06F 7/52; G06G 7/16; G06J 1/00

[52] U.S. Cl. .................................... 364/713; 364/606; 364/754; 364/841

[58] Field of Search ............... 364/606, 713, 754, 819, 364/841, 728, 822, 845; 350/162.14, 353

[56] References Cited

U.S. PATENT DOCUMENTS

| | | | |
|---|---|---|---|
| 3,763,365 | 10/1973 | Seitz | 364/754 |
| 3,956,624 | 5/1976 | Audaire et al. | 364/841 |
| 3,996,455 | 12/1976 | Schaefer | 364/713 |
| 4,308,521 | 12/1981 | Casasent et al. | 364/822 |
| 4,314,348 | 2/1982 | Carr | 364/728 |
| 4,334,277 | 6/1982 | Bond et al. | 364/606 |
| 4,351,589 | 9/1982 | Chavel et al. | 364/713 |
| 4,363,106 | 12/1982 | Tai | 364/713 |
| 4,493,045 | 1/1985 | Kung et al. | 364/728 |
| 4,505,544 | 3/1985 | Blodgett | 364/822 |
| 4,567,569 | 1/1986 | Caufield et al. | 364/841 |
| 4,569,033 | 2/1986 | Collins et al. | 364/713 |
| 4,588,255 | 5/1986 | Tur et al. | 364/728 |

OTHER PUBLICATIONS

Speiser, J. M. and Whitehouse, H. J., "Parallel Processing Algorithms and Architectures for Real-Time Signal Processing," *Proceedings SPIE,* vol. 298-301, Aug., 1981.

Caulfield, Rhodes, Foster, Horvitz, "Optical Implementation of Systolic Array Processing," *Optics Communications,* vol. 40, No. 2, Dec. 15, 1981.

Whitehouse, H. J. and Speiser, J. M., "Linear Signal Processing Architectures," pp. 669-702, *Aspects of Signal Processing Part* 2, G. Tacconi, editor, Proceedings of the NATO Advanced Study Institute, D. Reidel Publishing Company, Boston, Aug. 30, 1976.

Rhodes, W. T., "Acousto-Optic Signal Processing: Convolution and Correlation," *Proc. IEEE,* vol. 69, pp. 65-79, 1981.

Guilfoyle, P. S., "Problems in Two Dimensions," Proc. SPIE, vol. 341-26, May 1982.

Guilfoyle, P. S., "Time-Integrating Optical Processors in One Dimension," Proc. Acousto-Optic Bulk Wave Devices Conference, *SPIE* vol. 214, pp. 27-37, Nov. 1979.

Guilfoyle, P. S., et al., "Joint Transform Time Integrating Acousto-Optic Correlator for Chirp Spectrum Analysis," *Optical Engineering,* vol. 20, No. 4, pp. 556-561, Jul./Aug. 1981.

Chang, I. C., "Acousto-Optic Devices and Applications," *IEEE Transactions on Sonics and Ultrasonics,* vol. SU-23, No. 1, Jan. 1976.

Collins, W. C., Athale, R. A., Stilwell, Ph.D., "Improved Accuracy for an Optical Iterative Processor," presented at the 22nd Annual *International Technical Symposium* of the International Society of Optical Engineers, Aug. 1982.

Hecht, D. L., "Multifrequency Acoustooptic Diffraction," *IEEE Transactions on Sonics and Ultrasonics,* vol. SU-24, No. 1, Jan. 1977.

Hecht, D. L., "Acoustooptic Signal Processing Device Performance," presented at Real Time Signal Processing II, *Society of Photographic and Instrumentation Engineers,* Apr. 19, 1979.

(List continued on next page.)

*Primary Examiner*—Archie E. Williams

*Assistant Examiner*—Dale M. Shaw

*Attorney, Agent, or Firm*—Limbach, Limbach & Sutton

[57] ABSTRACT

An optical computing apparatus and method for high speed multiplication of numerical array, wherein the arrays to be multiplied are arranged according to a systolic processing or engagement processing format, and wherein the element multiplication is performed by analog convolution. In a preferred embodiment of the invention, the multiplication is implemented with first and second spacial light modulated devices which provide the selected processing format in one spacial dimension and binary multiplication by analog convolution in a second spacial dimension.

33 Claims, 10 Drawing Figures

OTHER PUBLICATIONS

Hecht, D. L., "Acousto-Optic Device Techniques—400 to 2300 $MH_z$," 1977 *Ultrasonics Symposium Proceedings,* IEEE, Cat. #77CH1264-ISU.

Hecht, D. L., "Spectrum Analysis Using Acousto-Optic Devices," *Optical Engineering,* vol. 16, No. 5, Sep.-/Oct. 1977, pp. 461-466.

McCanny, J. V. and McWhirter, J. G., "Implementation of Signal Processing Functions Using 1-Bit Systolic Arrays," Jan. 25, 1982.

Swartzlander, Jr., E. E., "The Quasi-Serial Multiplier," *IEEE Transactions on Computers,* Vo. C-22, No. 4, Apr. 1973.

Bocker, R. P., et al., "Rapid Unbiased Bipolar Calculator Cube", *Applied Optics,* vol. 22, No. 6, pp. 804 et. seq.

$$\begin{bmatrix} a_{11} & a_{12} & a_{13} \\ a_{21} & a_{22} & a_{23} \\ a_{31} & a_{32} & a_{33} \end{bmatrix} \begin{bmatrix} b_1 \\ b_2 \\ b_3 \end{bmatrix} = \begin{bmatrix} c_1 \\ c_2 \\ c_3 \end{bmatrix}.$$

(SYSTOLIC)

(ENGAGEMENT)

COMPUTING METHOD AND APPARATUS

TECHNICAL FIELD

The present invention is generally related to computing methods and apparatus and, more specifically, to an optical computing method and apparatus.

BACKGROUND OF THE INVENTION

Currently in the computer field, there is a generally recognized effort to develop computers that can process increasingly larger amounts of information at progressively higher speeds, but with lower cost and size. Presently, digital computing systems are available which can perform seven to ten million multiplications per second with some systems providing speeds of $10^8$ to $10^9$ multiplications per second and up to 64-bit accuracy. Unfortunately, the cost of such systems range in the millions of dollars. Similarly, analog optical computing systems have been proposed which, theoretically, operate at speeds far superior ($10^{10}$ to $10^{18}$) to the aforementioned digital systems. However, these analog optical systems suffer from low accuracy, typically less than 11 bits. A method for multiplication of two integer numbers using binary representations, for example, positive real or 2's complement, of the integer by analog convolution has previously been suggested in the surface acoustic wave (SAW) and charge coupled device (CCD) areas of technology. Such a method offers high accuracy but also a limited throughput rate.

Existing analog optical computers are hardware efficient and extremely fast. They are, however, lacking in generality, typically performing only a single computation. Their accuracy has thus been limited by the output detector such that a dynamic range of a few thousand to one is typical. This corresponds to an accuracy of 10 to 12 bits.

In the digital processing community, there is a well-known trade-off in signal processing systems between processor speed, accuracy, and generality. Digital computer architects have found, for example, that the price for generality in highly parallel electronic processing structures include decreased speed, decreased efficiency utilization, and increased software requirements. The requirement of high accuracy also increases hardware complexity or decreases speed. As a consequence, considerable research in the digital community has focused on more efficient/general purpose computing methods and associated structures. The result has been the VHSIC program with its emphasis on systolic array structures, which are capable of many matrix-or array-oriented algebraic signal processing operations. This work is of particular importance since it has been recently shown, for example, that a majority of the signal processing tasks can be reduced to a common set of basic matrix operations.

The present invention provides a binary optical computer capable of performing matrix/vector computations, which implements a method of processing that employs a systolic processing format which couples the speed of optics with the general purpose programmability of systolic arrays. As a result, speed, accuracy and generality are maximized.

SUMMARY OF THE INVENTION

The foregoing and other problems of prior computing systems are overcome by the present invention of a method and apparatus for multiplying a first array of numbers by a second array of numbers, wherein each of the numbers is in form, including a multiplier having a plurality of data paths which are grouped into first and second sets of data paths. The first set of data paths receives signals from multiplier inputs while the second set of data paths receives signals from multiplicand inputs. Digital words applied to the multiplier inputs are multiplied, by way of analog convolution with digital words applied to the multiplicand inputs, wherein the results of each multiplication are supplied as digital word products at a product output. Each of the data paths has a predetermined data propagation velocity which determines the amount of time required for signals supplied to the path to traverse the path. Selected points along the data paths of the first set of data paths are compared with selected points along the data paths of the second set of data paths. The points which are compared are selected so that when a first signal is applied at a given point in time to a data path of the first set of data paths (hereinafter "first-set data path") and a second signal is applied at the same given point in time period data path of the second set of data paths (hereinafter "second-set data path"), the first signal will arrive at the selected point on the first-set data path substantially simultaneously with the arrival of the second signal at the point selected for comparison on the second-set data path; and so that the first signal will arrive at other selected points of the first-set data path substantially simultaneously with the arrival of other signals at points selected for comparison along other data paths from the second set of data paths (hereinafter "other second-set data paths"), wherein these other signals are applied to these other second-set data paths at predetermined points in time previous or subsequent to the given point in time.

Sequencing means are provided for rearranging the first and second arrays into a designated processing format and for supplying the numbers from the rearranged arrays to the multiplicand and multiplier inputs respectively. Also provided are means for accumulating the binary word products from the multiplier product output in accordance with the designated processing format.

In a preferred embodiment, the multiplier is implemented in optical processor form including first and second acousto-optic, spatial light modulating devices for performing binary multiplication by analog convolution in one spatial dimension and for implementing an engagement processing or systolic processing format in another spatial dimension.

A further embodiment is implemented in digital electronic form.

A computing system constructed according to the present invention provides massive parallelism of operations by which a large number of multiplications can be performed at extremely high speed and high accuracy.

It is therefore an object of the present invention to provide an array processing system wherein engagement or systolic processsing is performed in one dimension or set of data paths, while binary multiplication by analog convolution is simultaneously performed in a different dimension or set of data paths.

It is another object of the present invention to provide a computing system for array multiplication including an optical multiplying apparatus which receives the arrays to be multiplied in an engagement or systolic format and which performs the multiplication by way of analog convolution.

The foregoing objectives, features and advantages of the present invention will be more readily understood upon consideration of the following detail description of the invention and accompanying drawings.

FIG. *2a* illustrates array multiplication using a systolic processing format.

FIG. *2b* illustrates array multiplication using an engagement processing format.

Figure 3:
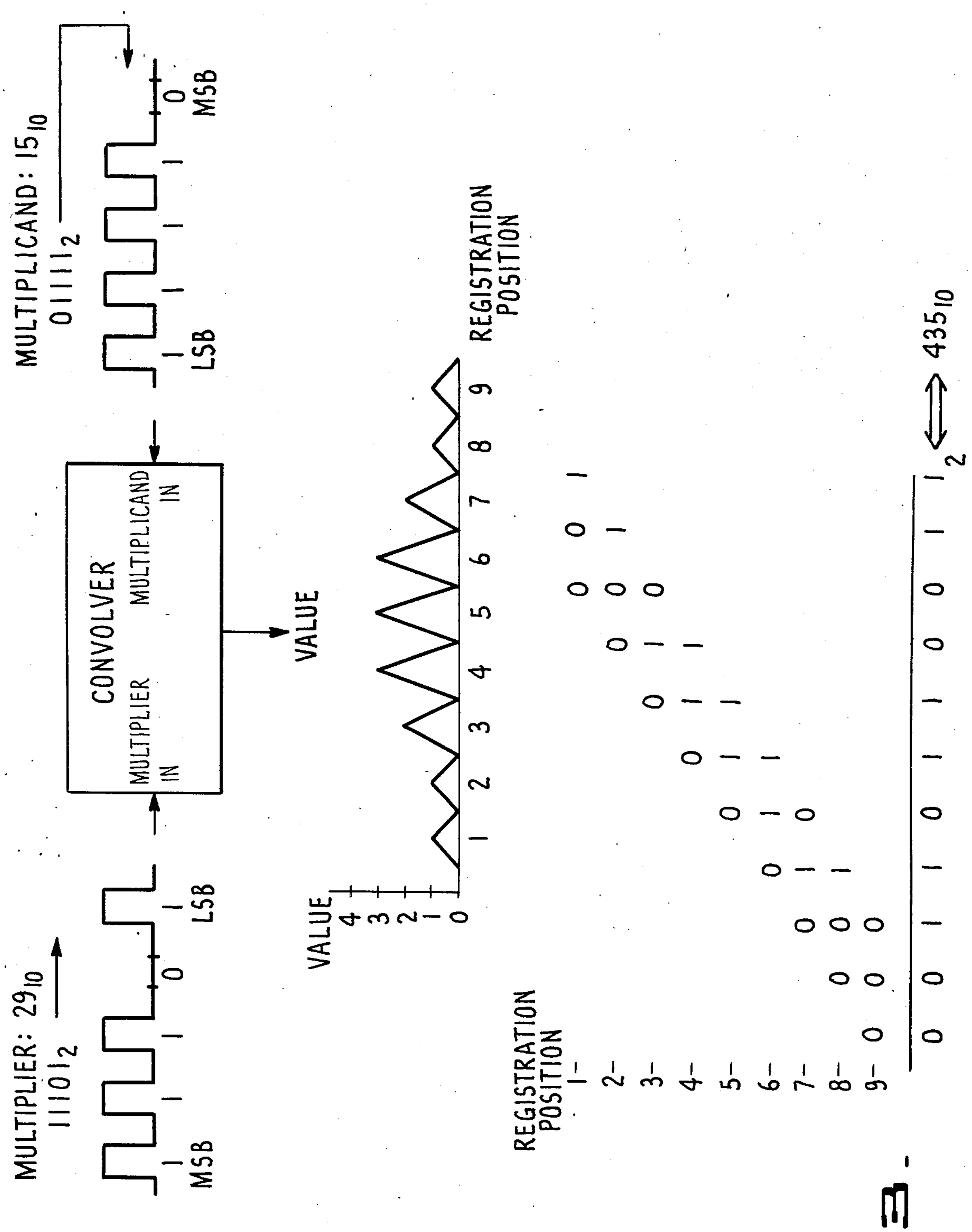

FIG. 3 illustrates binary multiplication by analog convolution.

FIGS. *4a* and *4b* provide a timing diagram illustrative of the data flow and operations on the data in the present invention.

Figure 5:
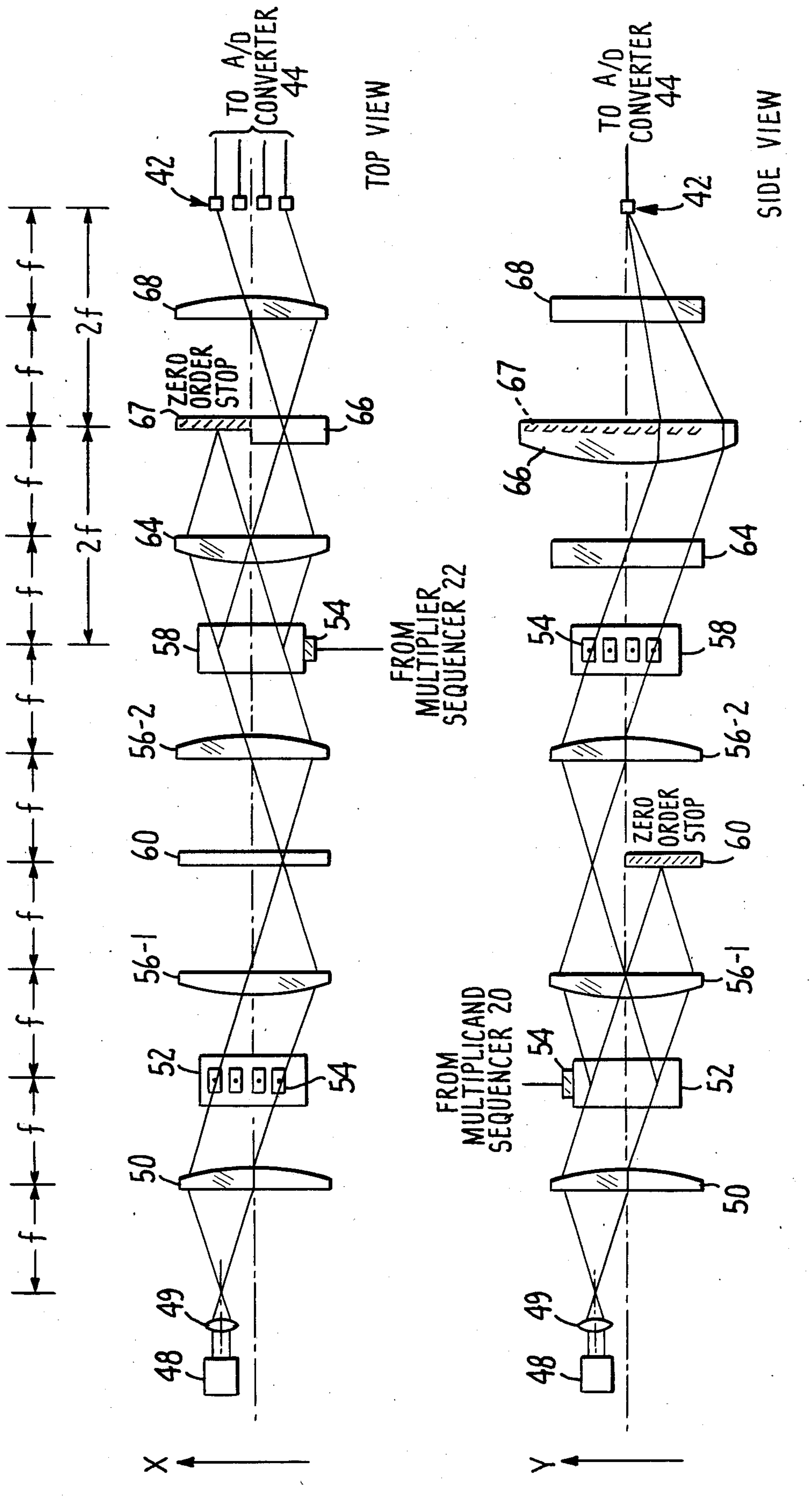

FIG. 5 is a functional illustration of an optical implementation of the present invention.

Figure 6:
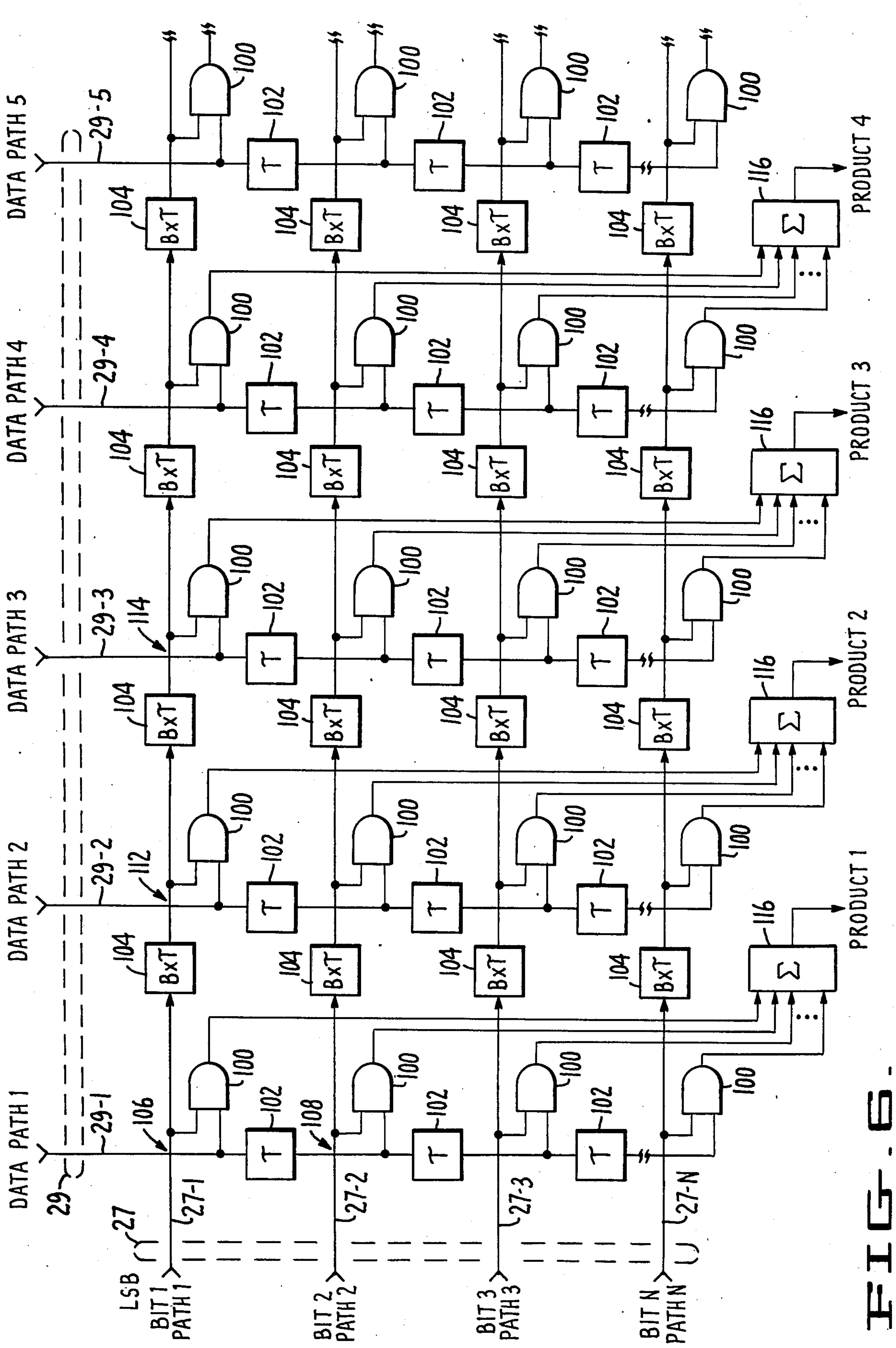

FIG. 6 is a diagrammatical illustration of the relationship between the data paths in the multiplier of the present invention.

Figure 7:
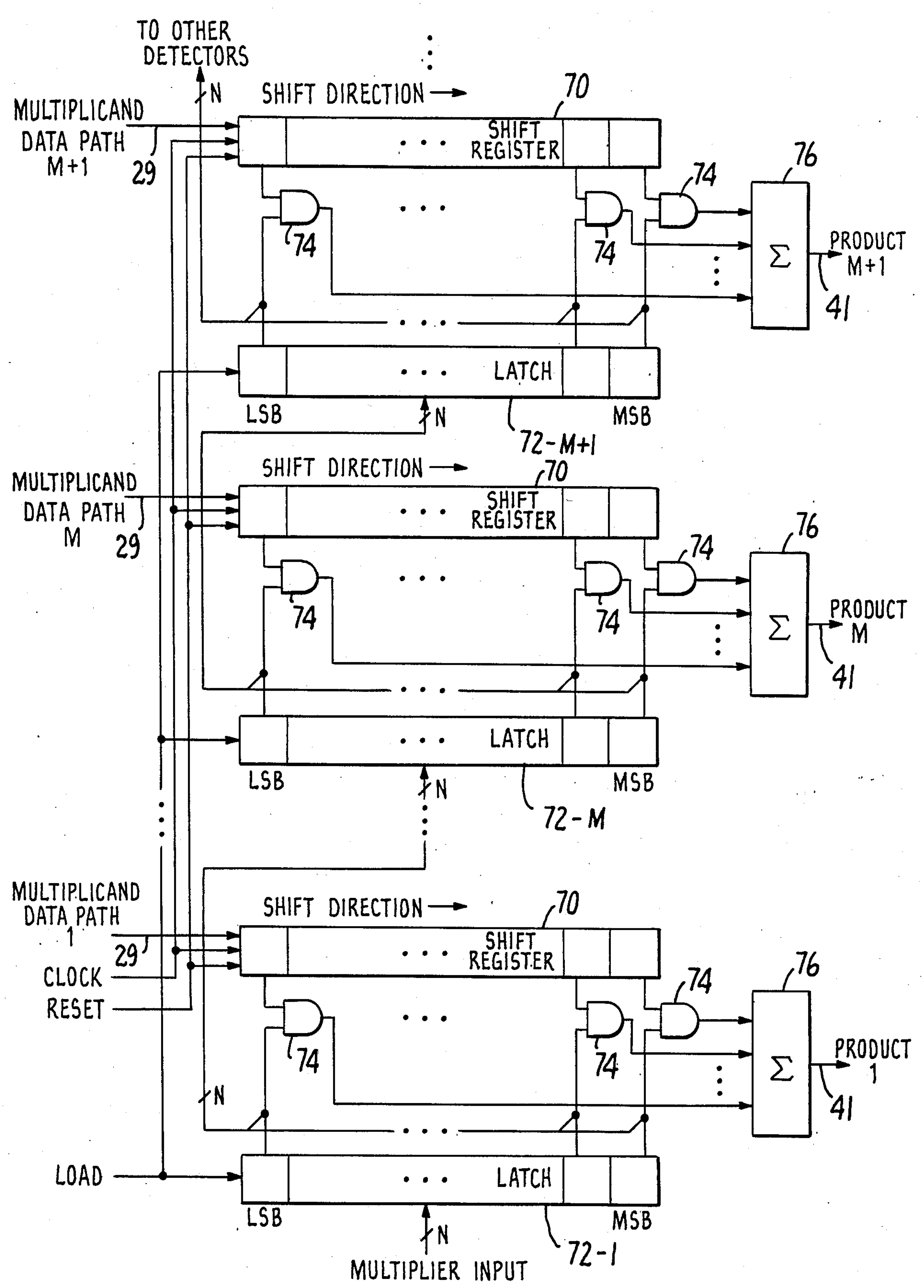

FIG. 7 is an illustrative functional block diagram of a digital implementation of the present invention.

Figure 8:
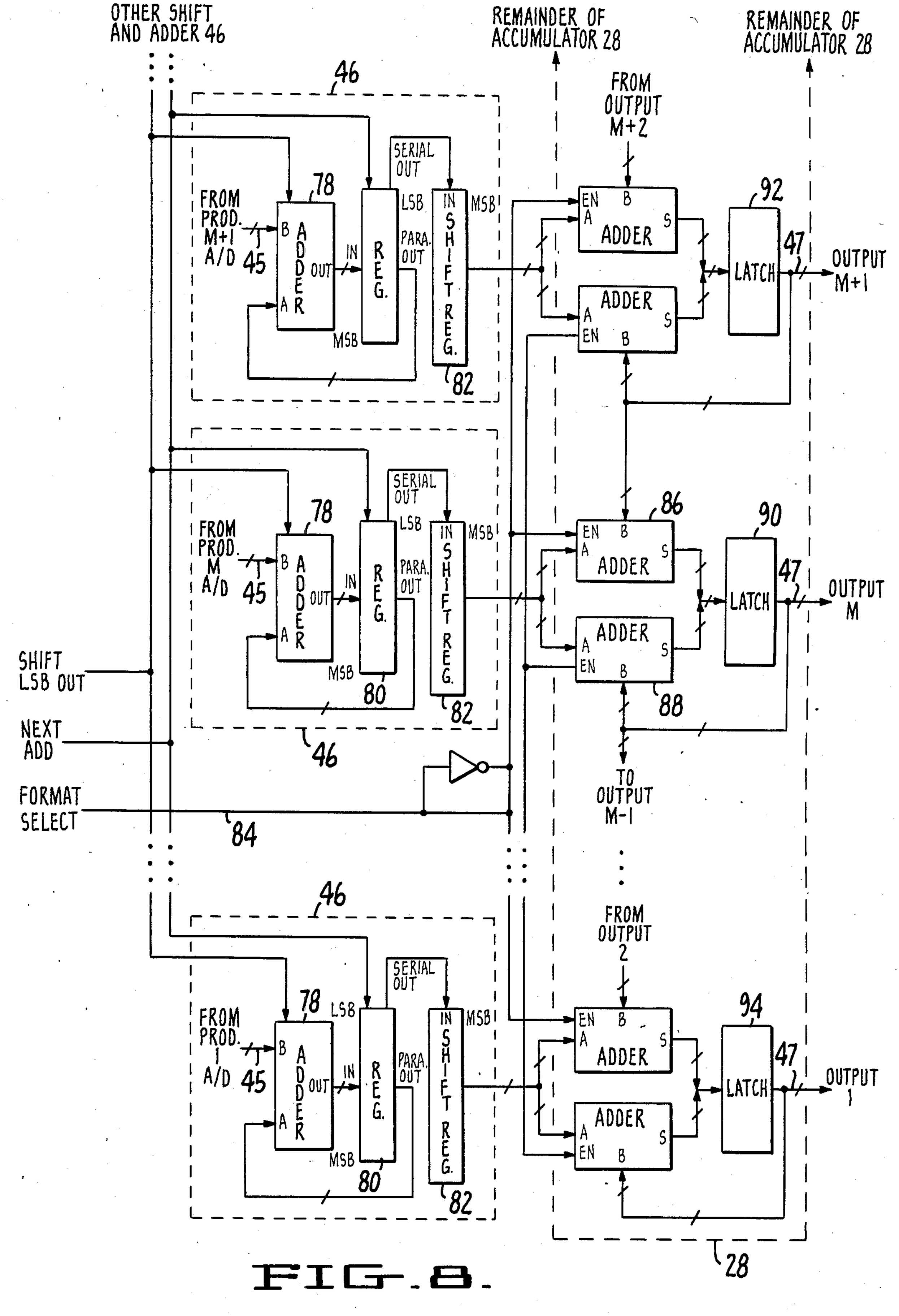

FIG. 8 is a functional block diagram of shift and add circuitry suitable for use in the present invention.

DETAILED DESCRIPTION OF THE INVENTION

Figure 1:
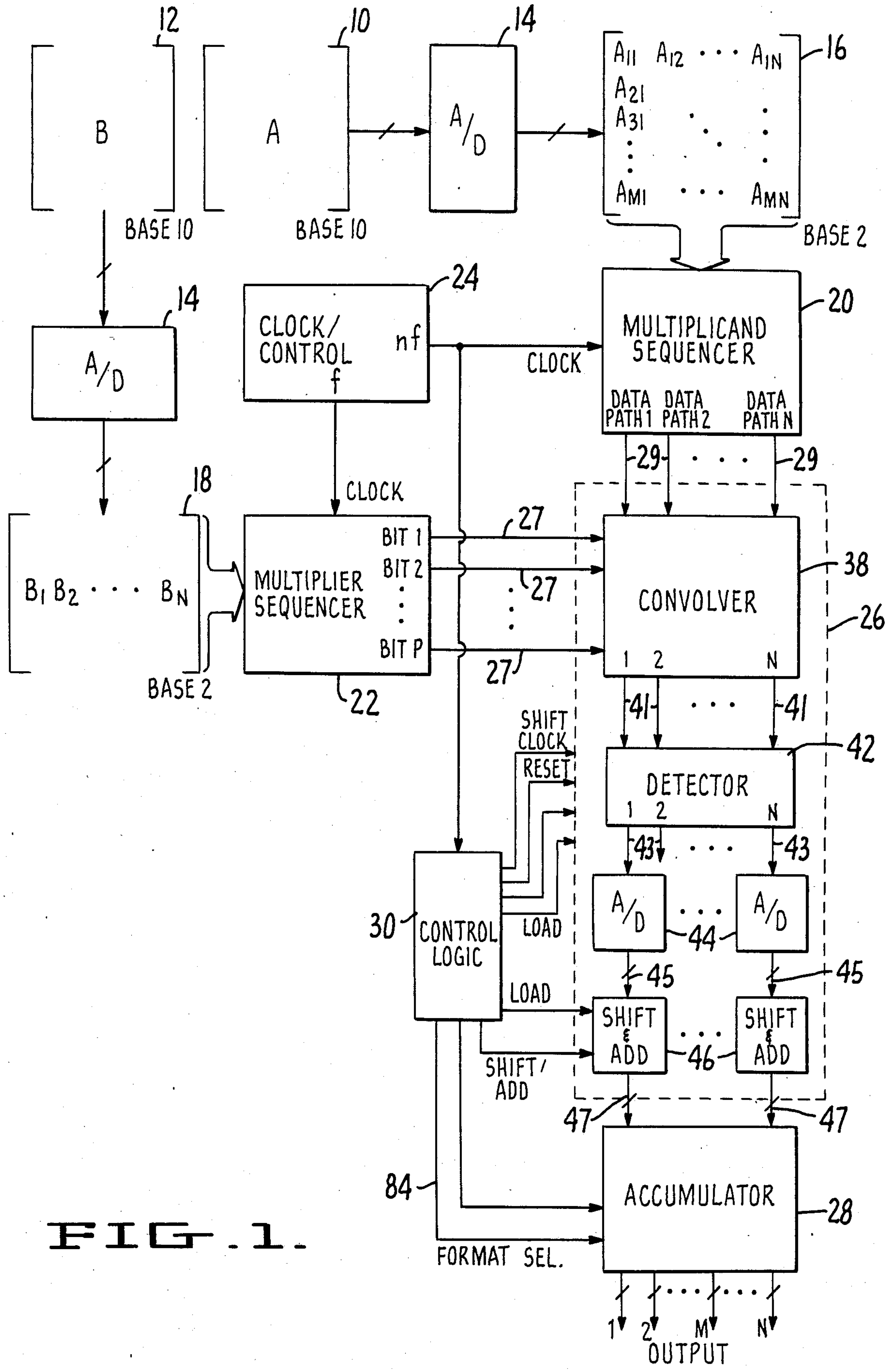
FIG. 1 is a functional block diagram of the present invention.

The present invention operates upon arrays of numbers, with the numbers in each array being represented in digital form. For purposes of explanation, assume that the numbers are in binary form. These arrays can already be in binary form or, as shown in FIG. 1, arrays A and B can be transformed by analog-to-digital conversion means 14 into an arrays of binary numbers 16 and 18, respectively. As shown in FIG. 1, each element in binary array 16 is a binary word having P elements. Likewise, array B is shown to have been converted into binary array 18 by analog-to-digital conversion means 14.

For purposes of explanation, binary array 16 will be referred to as the multiplicand array and binary array 18 will be referred to as the multiplier array.

The multiplicand array is supplied to multiplicand sequencer 20, while the multiplier array is supplied to multiplier sequencer 22. These sequencers rearrange the binary words in each array into a designated format, for example, a systolic processing format or an engagement processing format. These sequencers can take the form of random access memories in which the words are stored according to the desired format. Clock/control circuitry 24 then provides timing signals to clock out the words in the same arrangement as they were stored and to supply the words to multiplier circuitry 26.

Multiplier 26 has a plurality of data paths and multiplies along each data path by analog convolution, subsequent conversion of the convolution result to a digital form, and a series of shift and add operations. The conversion of the convolution result to digital form can be to base 2, or another base. In multiplier 26, multiplicand array words are paired with multiplier array words for multiplication. These pairings are determined by the format in which and the timing with which the words from each array are supplied to multiplier 26. Multiplier 26 is structured so that a multiplier array word applied at the multiplier inputs 27 at a given point in time will be paired with multiplicand array words applied at the multiplicand inputs 29 at subsequent points in time. Thereafter, as the multiplication of each pair of words is completed, the product thereof is provided to accumulator circuitry 28 which sums the multiplier-word/multipicand word products according to the processing format utilized by multiplicand and multiplier sequencers 20 and 22, respectively. Control logic 30 is responsive to the clock/control circuit 24 to provide control signals to multiplier 26 and accumulator 28.

The above-described processing structure provides high speed, high accuracy processing capabilities with a minimum of hardware and cost.

Systolic and Engagement Processing Formats

Referring to FIGS. *2a* and *2b*, the systolic and engagement processing formats utilized in the present invention will now be described in greater detail. These processing formats determine the order, timing and distribution among the data paths of the words being multiplied.

FIG. *2a* illustrates the systolic processing format. For matrix/vector computation involving a multiplier array comprising an N element vector and a multiplicand array comprising an N×N matrix, a multiplier having 2N−1 data paths and a shift-and-add device of length 2N−1 are utilized. In FIG. *2a*, the systolic array processing format for a 3 by 3 matrix and a 3 element vector is illustrated. Units of time are represented by "t" and the resulting outputs of the operation are represented by "c". In order to simplify this explanation, assume that the elements of the array and vector are in analog form.

For the particular example, a multiplier/shifter having five data paths is utilized, along with a five position (or bin) shift and add device. The systolic processing format requires that the elements of the 3 by 3 matrix be supplied to the multiplier 32 in coordination with the elements from the vector at specific points in time. As can be seen from FIG. *2a*, the matrix is tilted so that its diagonals are applied to specific multiplier paths. Note that the matrix elements are also staggered in time. The elements from the vector are loaded into multiplier 32, serially and spaced in time.

The components of the vector are shifted into the multiplier 32 starting at clock cycle $t_{-2}$ and are clocked-in at every other clock cycle as shown. For each subsequent clock cycle, the vector components already in the multiplier 32 are shift upwards to the next multiplier path in order. $b_1$ enters the first multiplier path 32-1 at time $t_{-2}$, $b_2$ enters the first multiplier path 32-1 at time $t_0$, and $b_3$ enters the first multiplier path 32-1 at time $t_2$.

The first element, $a_{11}$, of the matrix is loaded into the third multiplier 32-3, at time $t_0$, to multiply with vector component $b_1$, thus forming the product $b_1a_{11}$. This product is then supplied to bin 34-3 of shift and add device 34. At time $t_1$, the contents of bins 34-1 through 34-5 are each shifted down to the next lower bin, i.e. the contents of bin 34-5 is shifted into bin 34-4, that of bin 34-4 is shifted into bin 34-3, etc. Also at time $t_1$, matrix element $a_{21}$ and $a_{12}$ are fed to the fourth and second multiplier paths 32-4 and 32-2, respectively, where they multiply with vector components $b_1$ and $b_2$, respectively. The two resulting products, $b_1a_{21}$ and $b_2a_{12}$ are transferred to shift and add bins 34-4 and 34-2, respectively, where they are added to the contents thereof.

Note that shift and add bin 34-2 already contains the product from the previous calculation, $b_1a_{11}$, as received from bin 34-3. This is added to the second product $b_2a_{12}$ to form the first two sums of output vector component $c_1$.

This process continues for three additional clock cycles until all output vector components: $c_1$, $c_2$ and $c_3$ have been formed. In all, $2N-1$ clock cycles are required to perform the multiplications required in the operation. $3N-1$ total clock cycles are used to clock in the data and clock out the results, and to perform the multiplications, for a single matrix/vector multiplication. However, when a series of matrix/vector multiplications are strung together in a continuous sequence, the total clock cycles per multiplication drops to $2N-1$. In contrast, a serial machine, i.e., using only one central processor, would require $N^2-2N+1$ clock cycles.

The systolic processing format can be generalized for an N-column, M-row matrix as follows:

| | | | | | | | | |
|---|---|---|---|---|---|---|---|---|
| $t_{M+N-1}$ | | | | | $A_{M,N}$ | | | |
| $t_{M+N-2}$ | | | | $A_{M-1,N}$ | ∅ | $A_{M,N-1}$ | | |
| $t_{M+N-3}$ | | | $A_{M-2,N}$ | ∅ | $A_{M-1,N-1}$ | ∅ | $A_{M,N-2}$ | |
| ⋮ | | | ⋮ | ⋮ | ⋮ | ⋮ | ⋮ | |
| $t_M$ | | | | | | | | $A_{M,1}$ |
| ⋮ | | | | | | | | |
| $t_N$ | $A_{1,N}$ | | | | | | | |
| ⋮ | | ⋮ | ⋮ | ⋮ | ⋮ | ⋮ | | |
| $t_3$ | | $A_{1,3}$ | ∅ | $A_{2,2}$ | ∅ | $A_{1,3}$ | | |
| $t_2$ | | | $A_{1,2}$ | ∅ | $A_{1,2}$ | | | |
| $t_1$ | | | | $A_{1,1}$ | | | | |

where $A_{MN}$ are binary words and t corresponds to units of time. The corresponding multiplier vector would then have N elements and would be supplied as follows:

| | |
|---|---|
| $t_{-N}$ | $B_1$ |
| $t_{-N+1}$ | ∅ |
| $t_{-N+2}$ | $B_2$ |
| $t_{-N+3}$ | ∅ |
| ⋮ | ⋮ |
| $t_{-1}$ | ∅ |
| $t_\emptyset$ | $B_{\frac{N}{2}+1}$ |
| $t_1$ | ∅ |
| ⋮ | ⋮ |
| $t_{N-5}$ | ∅ |
| $t_{N-4}$ | $B_{N-1}$ |
| $t_{N-3}$ | ∅ |
| $t_{N-2}$ | $B_N$ |

Figure 2A:
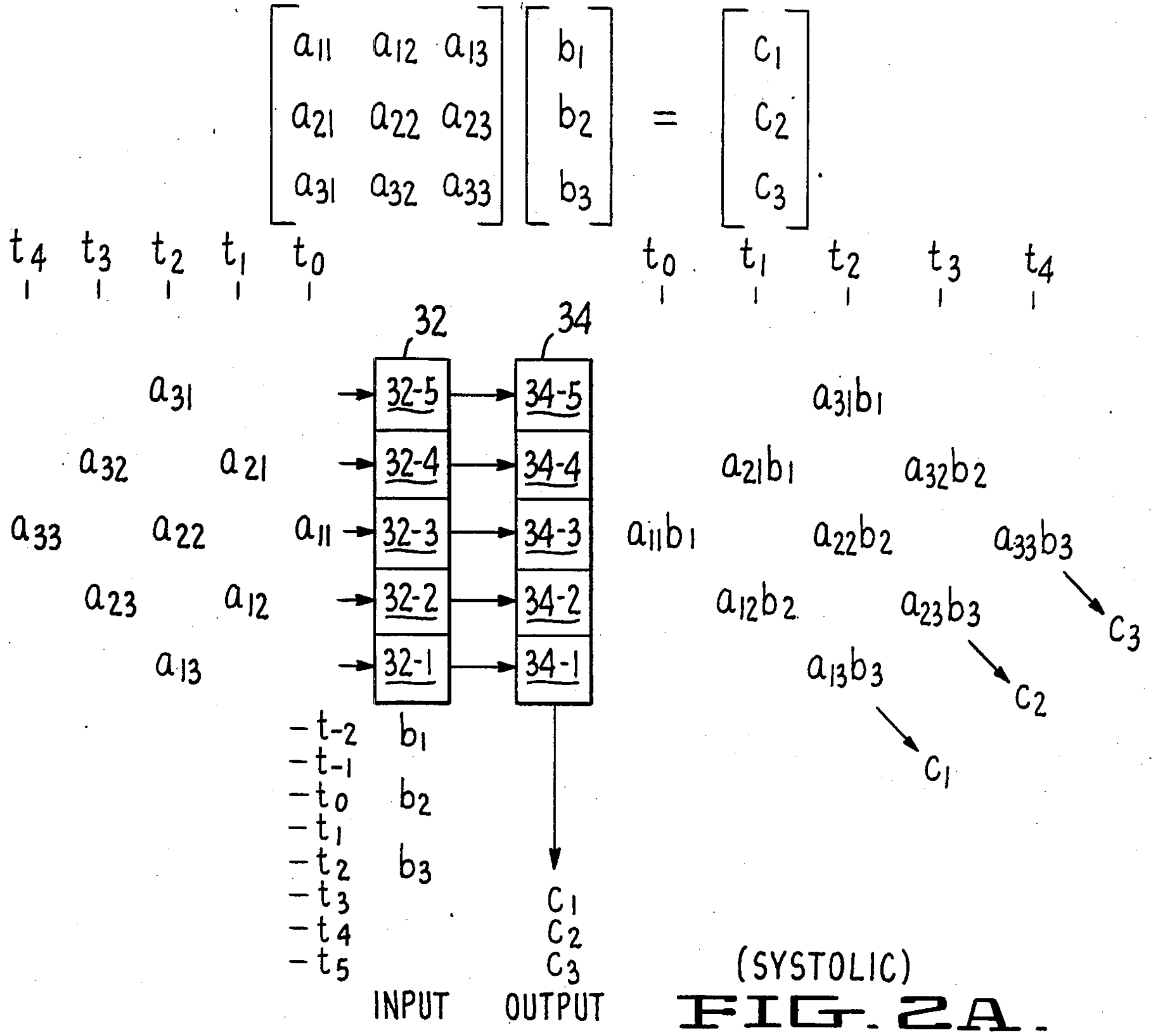
Figure 2B:
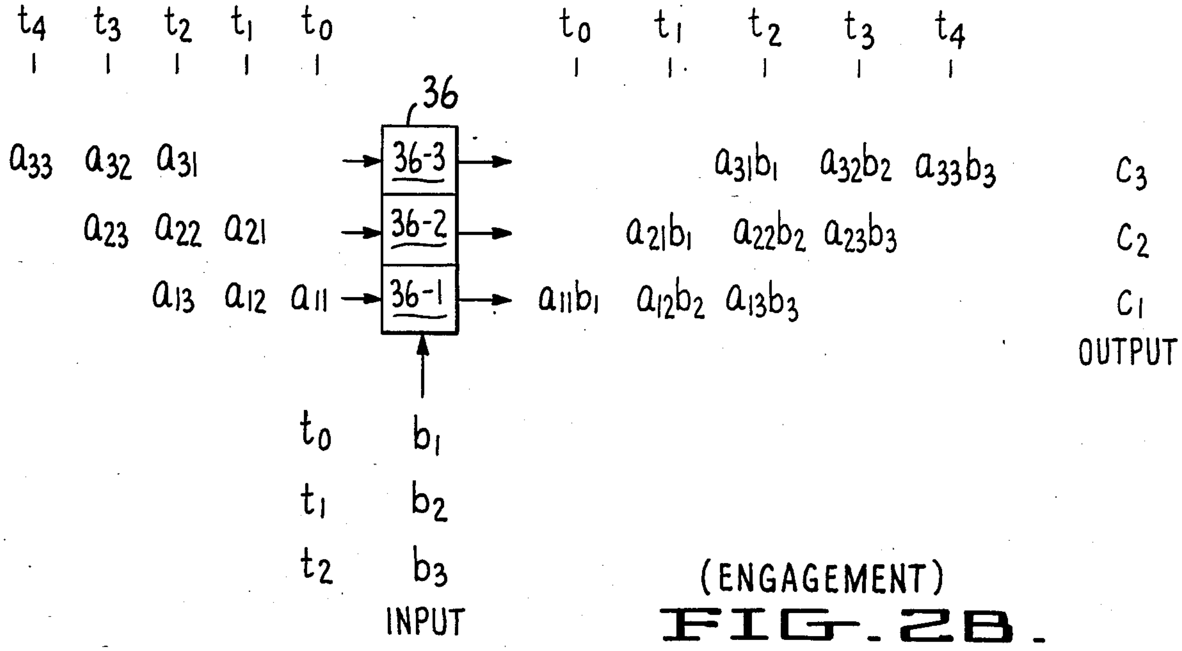

Referring to FIG. 2*b*, the engagement processing format is illustrated. As contrasted with the systolic processing format above, only an N-path multiplier and an N adder are utilized, compared with $2N-1$ in the systolic case.

As can be seen from FIG. 2*b*, the array is rearranged by rows with each row being inputted into a different multiplier path and with each successive row being delayed in time by one clock cycle from the previous row. Note also that the elements of the vector are inputted into multiplier 36 continuously without any space in time between elements.

At time $t_0$, vector component $b_1$ is multiplied with matrix element $a_{11}$ in multiplier path 36-1. The resultant product $b_1a_{11}$ is retained within the multiplier path 36-1 to be added to the next product at time $t_1$. At time $t_1$, component $b_1$ is shifted into multiplier path 36-2 to multiply against matrix element $a_{21}$. This forms the first product of output vector component $c_2$ and equals $b_1a_{21}$. At the same time, input vector component $b_2$ enters the first multiplier path 36-1 to multiply against matrix element $a_{12}$. This forms the second product of output vector component $c_1$. The first multiplier path 36-1 now contains the sum $b_1a_{11}+b_2a_{12}$. This process continues for three more clock cycles until all components $c_1$, $c_2$ and $c_3$ have been formed.

The engagement processing format can be generalized for an N-column, M-row matrix as follows:

| | | | | | |
|---|---|---|---|---|---|
| $t_{M+N-1}$ | | | | | $A_{M,N}$ |
| $t_{M+N-2}$ | | | | $A_{M-1,N}$ | $A_{M,N-1}$ |
| ⋮ | | | | ⋮ | ⋮ |
| $t_{M+1}$ | | | | $A_{M-1,3}$ | $A_{M,2}$ |
| $t_M$ | | | | $A_{M-1,2}$ | $A_{M,1}$ |
| $t_{M-1}$ | | | | $A_{M-1,1}$ | |
| ⋮ | | | | | |
| $t_{N+1}$ | | $A_{2,N}$ | $A_{3,N-1}$ | | |
| $t_N$ | $A_{1,N}$ | $A_{2,N-1}$ | $A_{3,N-2}$ | | |
| ⋮ | ⋮ | ⋮ | ⋮ | | |
| $t_3$ | $A_{1,3}$ | $A_{2,2}$ | $A_{3,1}$ | | |
| $t_2$ | $A_{1,2}$ | $A_{2,1}$ | | | |
| $t_1$ | $A_{1,1}$ | | | | |

where $A_{MN}$ are binary words and t corresponds to units of time. The corresponding multiplier vector would than have N elements and would be supplied as follows:

| | |
|---|---|
| $t_N$ | $B_N$ |
| ⋮ | ⋮ |
| $t_3$ | $B_3$ |
| $t_2$ | $B_2$ |
| $t_1$ | $B_1$ |

Binary Multiplication By Analog Convolution

The present invention utilizes digital multiplication by analog convolution to achieve high accuracy, in combination with selected processing formats to maintain a substantial throughput. FIG. 3 illustrates binary multiplication by analog convolution. In the example, the number 15 is multiplied by the number 29. Each number can be represented in binary form using five bits, as illustrated in the figure. The binary form of the multiplier, i.e. number 29, is fed, least significant bit first, into convolver 38. The binary form of the multiplicand, i.e. number 15, is also fed into convolver 38, least significant bit first, but in a direction counter to that of the multiplier. Functionally, in convolver 38 the multiplicand and multiplier are translated with respect to one another with the multiplicand being translated in reverse order with respect to the multiplier. As the translation progresses, bits of the multiplier come into registration with bits of the multiplicand. For each different registration, the convolver 38 examines the pairs of bits in registry to determine whether both of the bits in each pair have a predetermined value. The convolver 38 provides an analog output which indicates how many of the pairs of bits in registry satisfy such a condition for each position of registration. In the example, convolver 38 determines if both bits of each pair are at a logic one state. For the five bit words being multiplied, convolver 38 examines nine positions of registration.

From a graphical point of view, one of the binary words is kept stationary while the other binary word is translated, with respect to the stationary word, one bit per registration position. As illustrated in FIG. 3, the multiplicand is translated least significant bit first with respect to the multiplier. It is to be understood that the same results can be had if the translation were most significant bits first for both words. The convolver 38 then examines the values of the bits which are aligned with each other.

Thus, for registration position 1, the least significant bits of the two words are aligned with one another and the convolver 38 provides a signal having a value of 1. This indicates that for the bit positions in alignment with one another, the bit position for one pair thereof contain a logic one state. In registration position No. 2, the multiplicand is translated one bit. In this position, the least significant bit of the multiplicand is now aligned with the second bit of the multiplier. Similarly, the second bit of the multiplicand is now aligned with the least significant bit of the multiplier. As such, there is still only one pair of bit positions which both have a logic one state. Thus, the value provided by convolver 38 for registration position 2 has a magnitude of one.

From FIG. 3, it can be seen that the multiplicand is translated with respect to the multiplier until all positions of registration have been examined.

In order to complete the multiplication operation, the analog value for each registration position is converted into digital form as it emerges from convolver 38. It is then shifted upward one bit and then added to the preceding sum. This operation can be seen at the bottom portion of FIG. 3. The result of this shift and add operation is then the multiplication product, by analog convolution in binary form.

The use of the just-described method of binary multiplication by analog convolution provides high accuracy with a low dynamic range requirement. Notice that the maximum value of the output of convolver 38 in the above illustration was 3. The worst case for the words multiplied as above would be represented when both words contain all ones. Under such circumstances, the maximum value required to be detected and converted into digital form would be 5. It can be shown that in a 32 bit system, for a 5-sigma, i.e. five standard-deviation, bit error rate, a dynamic range of only 320 to 1 would be required for the device which detects the magnitude for the value of the convolution of each registration position. Recall that one of the major problems in analog optical computing was the large dynamic range requirement for the detectors in such a system. Note that a 5-sigma system yields the probability of making an error of one part in $10^{12}$.

The analog-to-digital conversion circuit used in the above procedure should have a resolution corresponding to the $\log_2$ of the maximum number of bits out of the convolver 38. Thus, in the example above, only a 3-bit converter would be required. As a further example, for a 100-bit number, corresponding to an accuracy of $1.2\times10^{30}$, an optical detector having a dynamic range of only 1000 to 1, and an analog-to-digital converter having only 7 bit accuracy, would be required.

Multiplier Structure

Figure 4A:
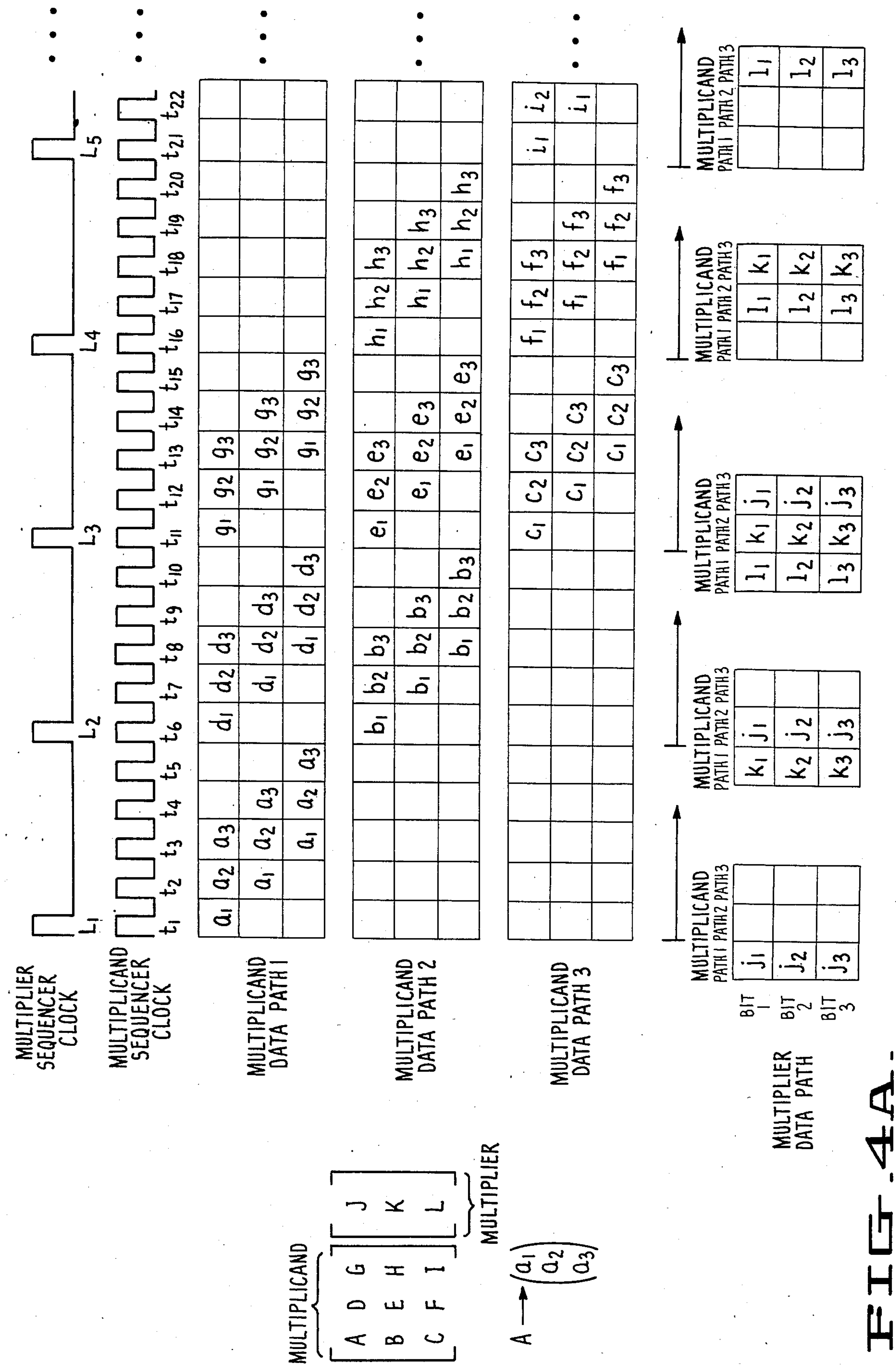
Figure 4B:
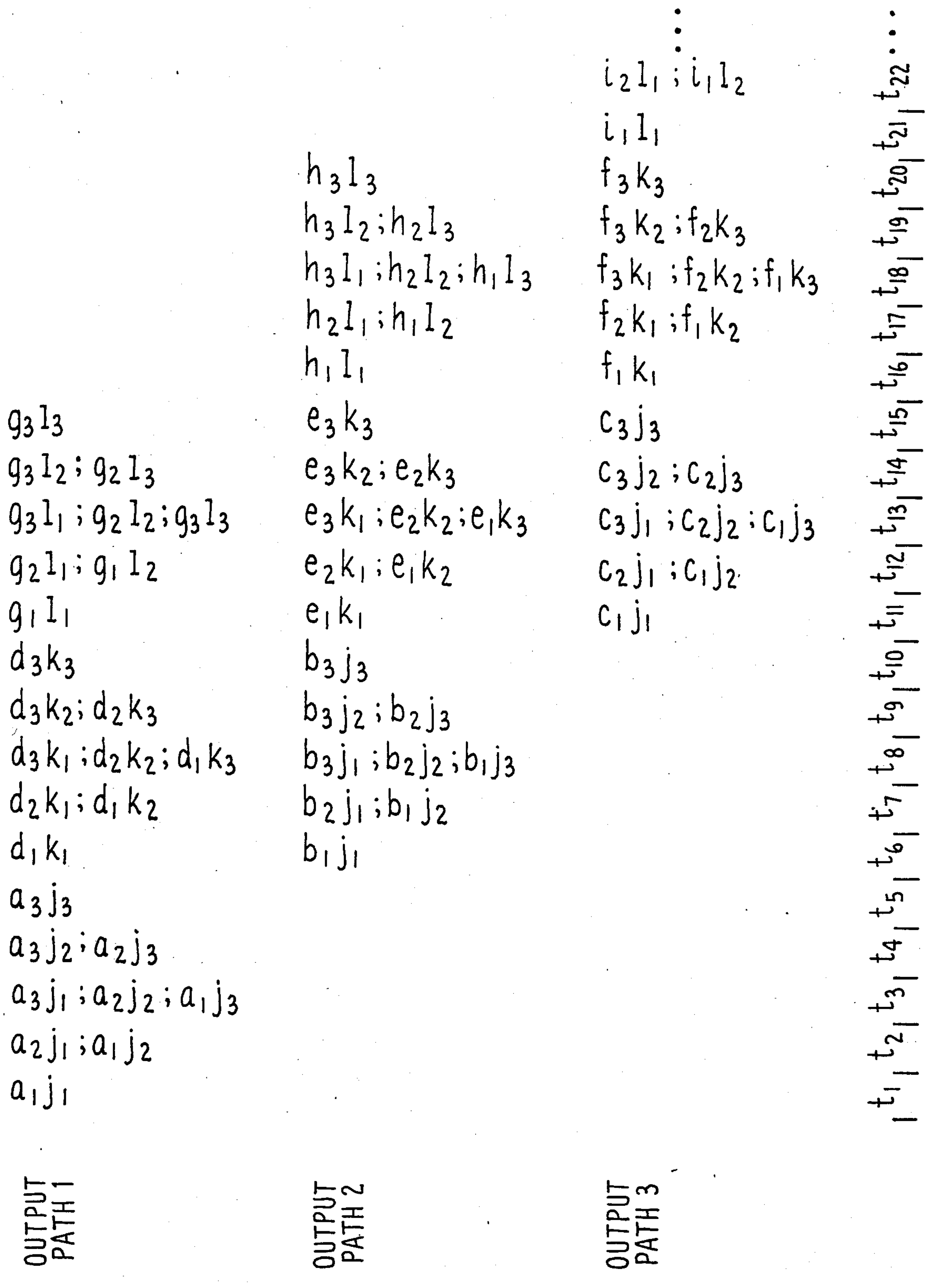

Returning to FIG. 1, the manner in which the systolic-engagement processing format and the binary multiplication by analog convolution procedure are utilized in the present invention will now be explained in greater detail. Reference is also made to FIG. 4*a* and 4*b*, which provide an illustrative example of the progression of the binary words within multiplier 26 for the engagement processing case.

The present invention utilizes what can be termed a two-dimensional processing structure. Multiplicand sequencer 20 supplies multiplicand binary words, serially, along one dimension while multiplier sequencer 22 supplies multiplier binary words, in parallel, along a second dimension. Binary multiplication by analog convolution is performed in one dimension and the pairing of words for the multiplication is performed in the other dimension. This provides an efficient yet highly accurate computational capability.

For purposes of explanation, multiplier 26 can be visualized as having a number of multiplicand data paths which lie along the vertical dimension of the page. Multiplicand sequencer 20 supplies binary words in serial fashion to each of these data paths. The particular elements which are supplied to a particular data path from the multiplicand array are determined by the processing format chosen.

Recall that in the engagement processing case, the rows of the matrix, or array, are supplied to each data path, with subsequent rows in the matrix being delayed by one clock cycle; see FIG. 2*b*. The binary words supplied by multiplicand sequencer 20 to multiplier 26 propagate down the data paths in parallel, but shifted in time. Each binary word is fed, bit-serially, to its assigned data path, one bit per multiplicand sequencer clock cycle t.

Multiplier sequencer circuit 22 supplies the binary words from the multiplier array, or vector, in bit-parallel form along multiplier data paths in the second dimension, in accordance with multiplier sequencer clock L. This second dimension can be visualized as being transverse to the first dimension, or across the page.

As can be visualized, there are points in time when multiplicand binary words travelling along the first dimension will be coincident with multiplier binary words travelling along the second dimension. It can thus be seen that, by proper timing of the application and propagation of the multiplicand binary words, and the application and propagation of the multiplier binary words to multiplier 26 the desired pairing of words can be achieved.

Because the multiplier binary words propagate in bit parallel form, and because the multiplicand binary words propagate in bit serial form, a binary multiplication by analog convolution procedure can be implemented for each of the data paths in the vertical dimension. Thus, in the present invention, an engagement or systolic processing can be performed along the second dimension while binary multiplication by analog convolution can be implemented along the first dimension.

As can be seen from FIG. 1, multiplier 26 includes a convolver 38 for performing analog convolution. Convolver 38 provides an analog output, as was discussed in FIG. 3, to detector circuitry 42. Detector circuitry 42 provides, for each output data path 43, and for each registration position of the convolution, an analog signal which represents the number of bit pairings having a predetermined value. Analog-to-digital conversion circuitry 44 converts these analog signals into binary form in each output data path 43. Shift and add circuitry 46 receive this binary data and shift and add the data to form the binary word representative of each binary word multiplication performed. Accumulator 28 then sums each of these binary products for each output data path 43 to provide the final output value.

Referring to FIGS. 4*a* and 4*b*, the operation of the present invention, in the engagement processing format for a three-by-three matrix/vector multiplication, will now be described. For purposes of explanation, assume that each element in the vector or matrix can be defined by a 3-bit binary word. Also for purposes of explanation, the elements of the matrix and vector are each identified by a different upper case alphabetic symbol. The bits in the binary word for a given element are in the form of the lower case of the alphabetic symbol for that element, and also include a subscript which identifies their bit positions in the word.

The first waveform illustrates the multiplier sequencer clock supplied from clock/control circuit 24. A multiplier binary word is supplied to convolver circuitry 38 for each pulse present in this waveform. The second waveform in FIG. 4*a* represents the multiplicand sequencer clock. Each pulse in this waveform represents the loading into convolver 38 of one bit in each multiplicand data path of the binary word being inputted thereto. The progression of this waveform from left to right represent progression in time.

Each block in the set of blocks labelled multiplicand data path 1 represents data path 1 along the first dimension in convolver 38. The cells in each block represent the intersections of the multiplicand data paths with the set of multiplier data paths in the second dimension. Each successive block illustrates the contents of the data path for a subsequent point in time as the multiplicand sequencer 20 supplies the binary words bit serially to the convolver 38.

At the bottom of FIG. 4*a*, the contents of the multiplier data paths along the second dimension are illustrated. These contents are unchanged for the periods between pulses in the multiplier sequencer clock waveform.

Thus, in conjunction with multiplier sequencer clock pulse L1, the multiplier data path contains bits $j_1$, $j_2$ and $j_3$, which are thus in coincidence with multiplicand data path 1. At multiplicand sequencer clock $t_1$, bit $a_1$ occupies the first cell of data path 1. Convolver 38 compares bit $a_1$ to bit $j_1$ and provides a convolution product output, shown in FIG. 4*b*, which represents whether or not a logic one is present in both bits. At time $t_2$, bit $a_1$ has been shifted down to the second cell and bit $a_2$ has been shifted into the first cell of data path 1. The convolver 38 compares bit $a_2$ to bit $j_1$ and bit $a_1$ to bit $j_2$, as shown in FIG. 4*b*. This shifting and comparison continues through multiplicand sequencer clock $t_5$. At this point the convolution of word A with word J has been completed.

At multiplicand sequencer clock $t_6$ and multiplier sequencer clock $L_2$, bit $d_1$ is shifted into multiplicand path 1. Simultaneously, bit $b_1$ is shifted into multiplicand path 2. Also note that in the multiplier data path, binary word J has been shifted to coincide with multiplicand data path 2, while binary word K has been shifted into coincidence with multiplicand data path 1. In this manner, convolution circuitry 38 now begins to convolve the bits of word D with that of word J, and the bits of word B with that of word K. This shifting and convolving continues until all of the words in the multiplier vector have been convolved with the appropriate words in the multiplicand matrix.

As each of the convolution products is output by convolver 38 on each of the output data paths 43, the analog-to-digital conversion circuitry 44 converts these convolution products into a digital format. These digital values are then passed to shift and add circuitry 46 where they are formed into the binary words representative of the binary word multiplication product, as illustrated in FIG. 3. Accumulator 28 then receives these binary word products and adds them together to arrive at the final output array values.

Convolver circuitry 38 can be implemented in several forms, including an optical form and a digital form. FIG. 5 illustrates an optical implementation, while FIG. 7 illustrates a digital implementation.

With respect to FIG. 5, the optical implementation shown therein provides processing at very high speeds, at low cost and small physical size. This optical structure exploits the inherent and unique ability of optical processors to parallel process information in two of the dimensions in space (X and Y). A coherent or incoherent optical source 48, such as a laser diode or light emitting diode (LED), illuminates collimating and focusing lens 50. The collimated light from lens 50 illuminates multielectrode acousto-optic device 52. The number of electrodes 54 for acousto-optic device 52 is determined by the length N of the columns of the matrix to be multiplied, or the length N of the input vector used in the multiplication, and by whether an engagement processing format or a systolic processing format is used. In the engagement case, the number of electrodes corresponds directly to this number, N. In the systolic processing case, the number of electrodes corresponds to $2N-1$. For larger matrices, matrix partitioning can be used whereby the partitions are small enough to be handled by devices having a limited number of electrodes.

Each electrode 54 receives, at some point in time, a binary bit stream from the matrix. An acoustic field is generated in acousto-optic device 52 in accordance with the bit stream. This modulates the collimated light from lens 50, as said light passes through acousto-optic device 52. The acoustic field associated with each electrode 54 propagates downward in acousto-optic device 52 in a columnar fashion.

The modulated light emerging from acousto-optic device 52 is then schlieren imaged by imaging lens 56 onto a second multi-electrode acousto-optic device 58. Briefly, in a schlieren imaging system, a first lens 56-1 images the modulated light beam from acousto-optic device 52 into separate frequency domain and time domain images. A stop 60 is utilized to block undeflected or unmodulated (D.C.) information from passing onto the remainder of the system. The frequency domain signal is permitted to pass. A second lens 56-2 then retransforms the frequency domain signal onto the intended target; i.e., acousto-optic device 58. The schlieren imaging system formed by lenses 56-1 and 56-2 and stop 60 are well understood in the art. A discussion of such a system can be found in the textbook entitled *Principles of Optics* authored by Born and Wolf.

As can be seen from FIG. 5, acousto-optic device 58 receives data in bit parallel fashion, and provides an acoustic field which propagates across the beam path transversely to the acoustic field in acousto-optic device 52.

The number of electrodes in the second acousto-optic device 58 corresponds to the number of bits in the words being multiplied. For example, for 16 bit words, 16 electrodes would be used. However, it is to be understood that bit and byte slicing techniques can be used to increase the number of bits and thus the resultant accuracy at a given time and without changing the number of electrodes needed.

As the acoustic field in second acousto-optic device 58 propagates therein, it interacts with the modulated light from acousto-optic device 54. With proper selection of the acousto-optic device material according to velocity of propagation, the propagation of the acoustic field in acousto-optic device 58 can be made to coincide with the appropriate acoustic fields propagating in acousto-optic device 54. For example where 10-bit words are being processed, an acoustic field propagation ratio of 10:1 for acousto-optic device 54 versus acousto-optic device 58 can be used. For 32-bit words, a ratio of 32:1 would be used. In turn this permits the implemention of the word pairings and multiplication function described above in connection with FIGS. 1, 4*a* and 4*b* under the "Multiplier Structure" section.

The light emerging from second acousto-optic device 58 corresponds to the product of the data in the first acousto-optic device 54 with the data in the second acousto-optic device 58, all in a two dimensional space. Because binary words are being multiplied the product of two bits is zero when either or all bits are zero. The product is a one when both bits are logic ones. This corresponds to the logical AND function.

These products are imaged to detectors 62 via lenses 64 and 68. Lens 66 is a cylindrical Fourier transform lens which focuses or space integrates in the Y dimension the instantaneous product across the entire Y-aperture of the acousto-optic device 58. Along the X dimension, the array dimension, Fourier transform lenses 64 and 68 form the output telecentric imaging lens pair which image the instantaneous words products from each data path onto corresponding detectors 42. As is well known in the art, the telecentric lenses maintain the light rays in colinear form, which in turn permits the transformation in the frequency domain. The outputs of detectors 42 are supplied to the analog-to-digital conversion circuitry 44 and thereafter to the shift and add circuitry 46 as shown in FIG. 1. As will be discussed in detail in a following section, the shift and add circuitry 46 functions differently in the engagement or systolic processing format. Additionally, this shift and add function can be accomplished using charge-coupled devices for detectors.

In operation then, the bits of the first word in the multiplicand matrix move along the Y dimension of the optical multiplier, convolving with the bits of the first word of multiplier vector, which move as a group along the X dimension. The integration for the convolution is performed by lens 66 along the Y dimension for each position of registration of the words being multiplied. Subsequent analog-to-digital conversion and shift and accumulation present the correct binary format to the user.

In the context of the example of FIGS. 4*a* and 4*b*, at time $L_2$, matrix elements B and D are fed bit serially to data paths 1 and 2, respectively. At this time, the acoustic field representing the bits of word J has propagated to a position corresponding to the data path 2 of acousto-optic device 54. Simultaneously, the bits for word K are parallel loaded into acousto-optic device 58 so as to be aligned with the data path one of acousto-optic device 54. At this time, two convolutions are performed: multiplicand word B with multiplier word J, and multiplicand word D with multiplier K. The above procedure continues until all desired convolutions are completed.

Returning to FIG. 5, additional detail will now be provided regarding the optical implementation of the present invention. The light source 48, shown in FIG. 5, can be device type HLP 1000, manufactured by Hitachi Corporation of Japan. An objective microscope lens 49 can be positioned between light source 48 and collimating lens 50 to perform a first level collimation. Lens 49 can be lens No. F-L10 manufactured by Newport Research Corporation of Fountain Valley, Calif. Lenses 50, 56-1 and 56-2 can be lens No. 01-LPX-155, manufactured by Melles Griot of Fountain Valley, Calif. Additionally, imaging lenses 64 and 68 can be lens No. 01-LCP-133, and one dimensional Fourier transform lens 66 can be lens No. 01-LCP-155, available from the Melles Griot Company. Shown positioned between Fourier transform lens 66 and imaging lens 68 is a DC stop 67 which blocks undeflected light and the zero order components of the light beam emerging from the Fourier transformer lens 66.

Detector 42 can be device type FND 100, manufactured by E.G. & G. Company of Mountain View, Calif.

Also provided at the top of FIG. 5, and denoted by the symbol f, is an indication of the optical distances between each of the elements in the optical implementation of the present invention.

Referring to FIG. 6, a diagrammatical illustration of the relationship between the data paths in the multiplier of the present invention is provided. The vertical lines 29 illustrate one set of data paths, while the horizontal lines 27 illustrate another set of data paths. As can be seen from the figure, data paths 29 cross data paths 27 at certain points. At each of these points, a logical AND 100 compares the signals present on the lines at the point where the lines cross.

Examining a particular data path, such as data path 29-1, there is shown a propagation time tau 102 which represents the amount of time required for data to traverse that segment of the path. With respect to horizontal data paths 27, a propagation time of B×tau 104 indicates that a period of time proportional to the time of propagation of 102 is required for data to travel across the indicated segment.

Thus, for data applied to data path 29-1, for example, the data will take a period of time tau to travel from point 106 to point 108, and another period of time tau to travel from point 108 to point 110. Similarly, data input at data paths 27-1 will require a time period of B×tau to travel from point 106 to point 112, and another period of B×tau to travel from point 112 to point 114.

By structuring the multiplier/convolver 38 of the present invention in the above manner, and by appropriate selection of the propagation times of the data along each of the paths, a large number of multiplications can be performed at extremely high speed and with high accuracy.

In relation to the optical embodiment of the present invention, the first acousto-optic device 54 contains the data paths represented by the vertical lines 29, and the propagation period tau 102. The second acousto-optic device 28 provides the data paths represented by horizontal lines 27 and propagation time B×tau 104. The interaction of the modulated light from first acousto-optic device 54 with the acoustic field propagating in acousto-optic device 58 is represented by logical AND functional block 100.

As can also be seen from FIG. 6, the outputs of logical AND functional block 100 are summed in summation blocks 116. Depending upon the implementation, these summation blocks will correspond to the Fourier transform lens 66 of the optical implementation, or the summing circuit in the digital implementation.

It is to be understood that the propagation times shown in FIG. 6 along each of the data paths are inherent within the acousto-optic devices of the optical implementation of the present invention, and that these delays can be selected by appropriate choice of acousto-optic device material.

Digital Implementation

FIG. 7 illustrates a digital implementation of convolver circuitry 38. In the structure illustrated, the multiplicand data paths take the form of shift registers 70, while the multiplier data paths take the form of interconnected latches 72. Each of the shift registers is a data path and receives and shifts a serial bit stream from multiplicand sequencer 20, see FIG. 1. Latch 72-1 receives, in bit-parallel form, the multiplier binary words from multiplier sequencer 22. Thereafter, on receipt of subsequent binary words from multiplier sequencer 22, latch 72-1 passes its then existing contents to the next latch in the train; i.e., 72-2 (not shown).

Corresponding bit positions in each of the shift register 70 are ANDed with the contents of corresponding bit positions of the associated latches 72. Thus, whenever the contents of the associated bit positions are at a logic 1 level, the AND gates 74 will provide a logic 1 output. After each shift of the multiplicand in the shift register 70 the number of logic 1 outputs are summed together in summing circuitry 76. The output of summing circuit 76 is preferably a digital signal.

In operation, the first multiplier binary word is loaded into latch 72-1. The multiplicand binary words are then clocked into the appropriate shift registers 70, least significant bits first. As each bit is clocked into a shift register, associated summing circuitry 76 provides an analog output corresponding to the number of associated bit position pairs both having logic ones therein. The bits from the binary words of multiplicand sequencer 20 are clocked through until the multiplicand binary word has been shifted through its shift register 70. Thereafter, the next multiplier word is clocked into latch 72-1, with each latch transferring its present contents to the next latch. Multiplicand sequencer 20 then supplies the next set of multiplicand binary words to shift registers 70. These words are clocked through the shift registers 70 and summing circuitry 76 provides an analog output for each shift of register 70 as before.

Shift and Add

Referring to FIG. 8, shift and add circuitry 46 and accumulator circuitry 28 will now be described in greater detail.

In FIG. 8, the shift and add circuitry for three out of N data paths are shown. This circuitry implements the shift and add operations described in connection with FIG. 3. Each shift and add circuit 46 includes an adder 78, a parallel-in, parallel-out, serial-out register 80, and a serial-in/parallel-out shift register 82. The digitized data from an analog-to-digital conversion circuit 44 for an output data path 43 is received by one set of inputs to adder 78. The other set of inputs to adder 78 is received from the parallel outputs of register 80.

The data supplied on the parallel output of register 80 is the binary representation of the sum of the previous addition operation in adder 78, which has been shifted downward by one bit. During this shift operation the least significant bit of the previous sum is shifted out of register 80 and into shift register 82. Register 80 receives as its input the output of adder 78 in parallel form. Where the binary words being multiplied have a maximum of p bits, 2 p shift and add operations will be needed to complete the procedure due to the final carry. Thereafter, the first 2 p bits in shift register 82 represent the completed product. The completed products from each shift and add circuit 46 are supplied to accumulator circuit 28. As mentioned earlier, the manner in which the completed products are accumulated is determined by the particular processing format used. Thus, accumulator 28 has a format select line 84 by which its operation can be set for accumulating products according to the engagement processing format or the systolic processing format. The operation of the accumulator 28 can be viewed as involving the addition of outer product terms.

As can be seen from FIG. 8, a pair of adders and a latch are associated with each shift and add circuit 46. Each of the pair of adders, for example 86 and 88, receive the same information from shift and add circuitry 46. The other input to adder 88 is received from latch 90. Latch 90 contains the sum from the previous add operation of adder 86 or 88. Adder 86 receives its other input from the output latch 92 corresponding to the next higher data path.

When in the engagement processing format, adder 88 is enabled while adder 86 is disabled. In this format, adder 88 accumulates the products from shift and add circuitry 46. No shifting of outputs occurs. The output for each data path is taken from the latch associated with the particular data path. As shown in FIG. 8, the output for data path M would be obtained from latch 90.

When in the systolic processing format, adder 88 is disabled while adder 86 is enabled. As mentioned above, adder 86 receives one input from the associated shift and add circuitry, and its other input from the latch associated with the next higher data path. The products thus propagate down the data paths to the latch 94 for data path 1. In this manner, the output for all output vectors is supplied out of latch 94. In the systolic format, as each new product emerges from a shift and add circuit 46, it is added to the previously existing sum from the next highest data path.

In the systolic processing format these elements can be collectively referred to as adjacent column addition means since the adder, e.g. 86, receives one of its inputs from an adjacent data path or column and adds it to the information from its associated shift and add circuitry, e.g. 46.

Preferred Embodiment of the Optical Implementation

Returning to FIG. 5, a practical implementation of a 10 bit word length optical process in the structure shown therein will now be discussed. As used hereinafter "us" shall mean microseconds and "um" shall mean micrometers. It is to be understood that implementations of many more bits are possible in accordance with the present invention.

Gallium phosphide, GaP, is the preferred material for acousto-optic device 54, while tellerium dioxide, $TeO_2$, is the preferred material for acousto-optic device 58. The reason for this choice is that the acoustic velocities of these two materials differ by a factor of 10: 6.3 mm/us for longitudinal mode GaP, and 0.63 mm/us for shear mode $TeO_2$. For processing of 10 bit words, these acoustic velocities allow the binary words in the multiplier vector to be fed into the second acousto-optic device 58 in parallel, rather than in a skewed timing configuration. Additionally, GaP material exhibits large bandwidths and as such provides for high throughput rates. Other parameters for operation of these devices, assuming a 10 bit word length, are provided in Table I.

TABLE I

Optical Processor Parameters (Example)

| | A.O. device 54 | A.O. device 58 |
|---|---|---|
| Material | GaP (longitudinal) | $TeO_2$ (shear) |
| Bandwidth: | 500 MHz | 50 MHz |
| Time/Bandwidth per channel: | 20 | 64 |
| Number of channels: | 32 | 10 |
| Acoustic velocity: | 6.3 mm/us | .63 mm/us |
| Pulse width: | | |
| (time) | 2 ns | 20 ns |
| (space) | 12.5 um | 12.5 um |
| Minimum transducer height: | 10.8 um @ $f_c$ = 1 GHz | 103.2 um @ $f_c$ = 100 MHz<br>72.9 um @ $f_c$ = 150 MHz |
| Interaction length - $L_o$: | 208 um at $f_c$ = 1 GHz | 142 um @ $f_c$ = 100 MHz<br>63.2 um @ $f_c$ = 150 MHz |
| Fabrication limits: | 40 to 50 um | 40 to 50 um |

One of the objectives in arriving at the parameters given in Table I above, is to reduce the anamorphism of the imaging portion of the processor by minimizing the electrode center to center spacing for the acousto-optic tranducers. As can be seen from Table I and FIG. 5, the width of all digital pulses, in each cell are identical. The design calls for a 10:1 ratio in cell acoustic velocity and bandwidth, which is ideal for a 10 bit system. As discussed, this is readily achievable by using GaP and $TeO_2$. In addition, a 500 megahertz bandwidth is common for GaP cells. Over 1 GHz bandwidth is achievable in GaP, for higher cost and reduced efficiency. $TeO_2$ performs extremely well when designed for an optic bandwidth of 50 megahertz and will allow several optical modes to be supported. These include Bragg, degenerate and tangential. Thus, binary data entering the second acousto-optic device 58 has a minimum pulsewidth of 20 ns, corresponding to a physical width of 12.5 um of the acoustic field which propagates along the device in response thereto. Similarly, since 10 bits, or pulses, are to be fed to the first acousto-optic device 54 for every binary word supplied to the second acousto-optic device 58, minimum pulsewidths of 2 ns are supported within the GaP material for the acousto-optic device 54. This corresponds to a physical width of 12.5 um which propagates in the Y dimension of acousto-optic device 54. If devices could be made ideally with 12.5 um high transducers, then the width of all pulses would equal their length and simple 1:1 imaging lenses could be used for lenses 56, 64, 66 and 68. Equation 1, device efficiency, gives the designer confidence to use small electrodes.

$$\eta = \frac{I_d}{I_i} = 5\left(\frac{M_2}{\lambda_o^2}\right) P_a \frac{L}{H} \quad (1)$$

It states that the diffraction efficiency is proportional to the inverse of the transducer height. Three constraints limit this minimum: (1) electrical power applied to the transducer, (2) electrode size practical fabrication limits and (3) acoustic diffraction.

Although the diffraction efficiency increases as a function of the applied electrical power (eq. 1), the amount of power that can be effectively applied to a electrode with dimensions on the order of 12.5 um before catastrophic failure is on the order of 10's of milliwatts. This, in return, reduces the device's diffraction efficiency. Coupled with realistic state-of-the-art electrode fabrication limits between 40 to 50 um, such an approach is also impractical under current capabilities.

The most severe constraint is acoustic diffraction. As the binary data enters the cell from each electrode it diffracts acoustically from its aperture. If this diffraction is large enough, these bits will cross over each other within the cell causing an undesired interaction, termed cross-talk. The ideal electrode geometry would be to have the electrodes equally spaced, with the electrode height equal to one half of the center-to-center spacing. Using this criterion, the minimum height for each transducer can be evaluated by the use of equation 2, optimum electrode height. This equation is bounded at the first zeros of the diffraction pattern generated by the electrodes rectangular acoustic aperture.

$$H_{opt} = \left(\frac{2NV_a^2}{f_cB}\right)^{\frac{1}{2}} = \left(\frac{2zV_a}{f_c}\right)^{\frac{1}{2}} \quad (2)$$

where N is the number of vector components, $V_a$ is the acoustic velocity of the material, $f_c$ is the center frequency of operation, and B is the bandwidth of the device. To achieve a design which will enable a 32×32 element matrix 32 component vector, the minimum transducer height for each electrode on the $TeO_2$ crystal is 103.2 um, almost 10 times that of the desired height. If the center frequency of operation is increased to 150 MHz this height is reduced to 72.9 um, however, the designer pays the penalty of reduced efficiency at a rate of 17.9 db/us-GHz$^2$. The situation in GaP is acceptable, 10.8 um except for the other two constraints mentioned above.

The acoustic interaction length also affects the electrode design geometry. The acoustic interaction length is defined as the physical acoustic path length through which the light travels (assuming no acoustic diffraction). This is a function of the electrode width, $L_o$. The equation describing optimal $L_o$ for maximum bandwidth and efficiency is given in equation 3.

$$L_o = \frac{n\Lambda}{\lambda_o} = \frac{nV_a^2}{\lambda_o f_c^2} \quad (3)$$

where n is the optical index of refraction, and lambda is the optical wavelength. The other terms have been previously defined. For the GaP cell, $L_o$ is 208 um at $f_c=1$ GHz. For $TeO_2$ Bragg regime, $L_o$ is 142 um at 100 MHz center frequency and 63.2 um at $f_c=150$ MHz. Notice that both are far greater than the 12.5 um required if square electrodes are to be utilized.

The first design iteration can now be effectively completed. By using square electrodes of 208 um on both acousto-optic devices and a reasonably reduced optical system anmorphism of 16.5, the pulse width can be made to equal its height in the image plane. In addition, by adopting a 208 um electrode geometry, the acoustic diffraction is also considerably reduced by approximately the same anamorphic ratio. This helps the situation because now it is possible to propagate the pulses for 8.17 us in the $TeO_2$ cell before crosstalk occurs. This increases the size of the matrix and vector that can be processed to a 204×204 element matrix 204 element vector (engagement case).

The construction of acousto-optic devices is well understood in the art. Discussions pertaining to Bragg Cells, one acousto-optic device type which is suitable for use in the present invention, can be found in the text books *Introduction to Optical Electronics* by Yariv, and *Acousto Optic Signal Processing* by Berg.

Using the above baseline design, an estimated system performance is compiled in Table 2.

TABLE 2

Estimated System Performance
(Matrix/Vector engagement configuration)

| | | |
|---|---|---|
| Output accuracy: | 20 bits | 120.4 db |
| Maximum input vector | | |
| (diffraction limited): | | |
| $L_o = H_t = 208$ um, $f_c = 150$ MHz: | 5.15 mm | |
| | 8.17 us | 204 TB (N) |
| $L_o = H_t = 208$ um, $f_c = 100$ MHz: | 3.43 mm | |
| | 5.45 us | 136 TB (N) |
| Throughput rate: | | |
| (200 × 200 element matrix) | 40,000 mult./array | |
| (200 component vector): | | |
| 399 digital word cycles | 15.96 us/array | |
| and 20 ns per word × 2: | | |
| Equivalent multiply-adds/second: | 2.5 × $10^9$. | |
| Discrete Fourier Transform (DFT) | | |
| example: | | |
| 200 point DFT in 15.96 us., B = 25 MHz. | | |

In accordance with the method of the present invention, a first array, called a multiplicand array, is multiplied by a second array, called a multiplier array, to provide an output array. The elements of the multiplier array, the multiplicand array, and the output array are in binary word form. The first step of the method involves placing the elements of the multiplier and the multiplicand array into a selected processing format. Typically, this format is selected to be either a systolic processing format or an engagement processing format. The elements of the rearranged multiplicand array and the rearranged multiplier array are supplied in accordance with the selected format to a multiplier. Within the multiplier, binary words from the rearranged multiplier array are associated with binary words from the rearranged multiplicand array according to the order and timing with which these words are applied to the multiplier. These associated words are then multiplied by way of analog convolution. In the multiplication by analog convolution sequence, selected bits of each of the associated words are compared with one another and a determination is made as to how many of these compared bits are of the same predetermined value. For each comparison made, a convolution signal is produced. This convolution signal is converted into binary form and accumulated. In the accumulation step, each subsequently received convolving signal is shifted upward by a number of bit positions, corresponding to a shift number. This shift number is incremented by one bit position upon receipt of each subsequent convolver signal. The accumulated binary word which exists at the end of the comparison sequence for a pair of associated words represents the product of the multiplication of the associated words. Thereafter, these multiplication products are accumulated according to the selected processing format to provide the elements of the output array.

It is to be understood that, while the above description is directed to a binary word format implementation of the present invention, the teaching of the present invention can easily be extended to other digital word formats such as trinary or other base number systems. The elements used thereon would be modified to handle the convolution, detection, summation, and other operations described above with reference to the levels and units present in such systems. For example, in a trinary system, three level detectors would be utilized.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. An apparatus for multiplying a first array of numbers by a second array of numbers to obtain a product vector, wherein each of the numbers in the first and second arrays are in the form of a digital word in binary format representative of the numver, comprising means having a plurality of multiplicand signal paths and a plurality of multiplier inputs for multiplying digital words by analog convolution, wherein digital words applied to each of the multiplicand signal paths propagate therealong and are multiplied by digital words applied to the multiplier inputs to form word products, including means for distributing the digital words from the multiplier inputs among the multipicand signal paths for multiplication with digital words propagating therealong;

first means coupled to the multiplicand signal paths of the multiplying means for rearranging the first array into an engagement or systolic processing format and for supplying the rearranged first array to the multiplying means;

second means coupled to the multiplier inputs of the multiplying means for rearranging the second array into the processing format used in the first rearranging and supplying the rearranged second array to the multiplying means, including second memory means for storing the second array and for supplying each binary word of the array in a bit-parallel format; and means for accumulating the word products from the multiplying means according to the processing format used in the first rearranging and supplying means.

2. The apparatus of claim 1, wherein for each signal path the multiplying means comprise means for convolving selected ones of the multiplicand digital words with selected ones of the multiplier digital words, wherein designated bits of the multiplicand digital words are compared with designated bits of the multiplier digital words and wherein a convolution product is generated for each comparison made, which convolution product represents the number of compared bits which both have a designated logic state;

means for converting each convolution product into digital form;

means responsive to the converting means for summing the digital-form convolution products as they emerge from the converting means, wherein each digital-form convolution product is shifted upward by a shift amount before being added to the previous sum of digital-form convolution products, said shift amount being incremented upon the receipt of each digital-form convolution product, and further wherein the sum of the shifted digital-form convolution products represents the product of the multiplicand digital word multiplied by the multiplier digital word for the signal path.

3. The apparatus of claim 1 wherein the numbers of the first and second arrays are in a binary format and further wherein the first rearranging and supplying means supply each binary word of the first array in a bit-serial format.

4. The apparatus of claim 3 wherein the first rearranging and supplying means include first memory means for storing the first array of numbers wherein the first array of numbers is stored therein by rows and further wherein the second and subsequent rows of the first array of numbers are stored at addresses translated from that for the first column so that when the first memory means are read-out, the columns of the first array are read-out in parallel in accordance wi:h the pattern -continued

| | | | | | | |
|---|---|---|---|---|---|---|
| $t_{M+N-1}$ | | | | | | $A_{M,N}$ |
| $t_{M+N-2}$ | | | | | $A_{M-1,N}$ | $A_{M,N-1}$ |
| . | | | | . | . | . |
| . | | | | . | . | . |
| . | | | | . | . | . |
| $t_{M+1}$ | | | | | $A_{M-1,3}$ | $A_{M,2}$ |
| $t_M$ | | | | | $A_{M-1,2}$ | $A_{M,1}$ |
| $t_{M-1}$ | | | | | $A_{M-1,1}$ | |
| . | | | . | . | | |
| . | | | . | . | | |
| . | | . | . | | | |
| $t_{N+1}$ | | $A_{2,N}$ | $A_{3,N-1}$ | | | |
| $t_N$ | $A_{1,N}$ | $A_{2,N-1}$ | $A_{3,N-2}$ | | | |
| . | . | . | . | . | | |
| . | . | . | . | . | | |
| . | . | . | . . | | | |
| $t_3$ | $A_{1,3}$ | $A_{2,2}$ | $A_{3,1}$ | | | |
| $t_2$ | $A_{1,2}$ | $A_{2,1}$ | | | | |
| $t_1$ | $A_{1,1}$ | | | | | |

wherein $A_{MN}$ represents a binary word in column N and row M of the first array and t represents units of time.

5. The apparatus of claim 3 wherein the first rearranging and supplying means include first memory means for storing the first array of numbers;

first means for addressing the first memory means so that the rows of the first array of numbers is read out of the first memory means in parallel in accordance with the pattern

| | | | | | | |
|---|---|---|---|---|---|---|
| $t_{M+N-1}$ | | | | | | $A_{M,N}$ |
| $t_{M+N-2}$ | | | | | $A_{M-1,N}$ | $A_{M,N-1}$ |
| . | | | | . | . | . |
| . | | | | . | . | . |
| . | | | | . | . | . |
| $t_{M+1}$ | | | | | $A_{M-1,3}$ | $A_{M,2}$ |
| $t_M$ | | | | | $A_{M-1,2}$ | $A_{M,1}$ |
| $t_{M-1}$ | | | | | $A_{M-1,1}$ | |
| . | | | . | . | | |
| . | | | . | . | | |
| . | | . | . | | | |
| $t_{N+1}$ | | $A_{2,N}$ | $A_{3,N-1}$ | | | |
| $t_N$ | $A_{1,N}$ | $A_{2,N-1}$ | $A_{3,N-2}$ | | | |
| . | . | . | . | . | | |
| . | . | . | . | . | | |
| . | . | . | . . | | | |
| $t_3$ | $A_{1,3}$ | $A_{2,2}$ | $A_{3,1}$ | | | |
| $t_2$ | $A_{1,2}$ | $A_{2,1}$ | | | | |
| $t_1$ | $A_{1,1}$ | | | | | |

wherein $A_{MN}$ represents a binary word in column N and row M of the first array and t represents units of time.

6. The apparatus of claim 3 wherein the first rearranging and supplying means include first memory means for storing the first array of numbers wherein the first array of numbers is stored therein by columns and further wherein each column is tilted with subsequent columns being displaced downward by a row so that when the first memory means are read-out, the columns of the first array are read-out in parallel in accordance with the pattern

| | | | | | | | |
|---|---|---|---|---|---|---|---|
| $t_{M+N-1}$ | | | | $A_{M,N}$ | | | |
| $t_{M+N-2}$ | | | $A_{M-1,N}$ | ∅ | $A_{M,N-1}$ | | |
| $t_{M+N-3}$ | | $A_{M-2,N}$ | ∅ | $A_{M-1,N-1}$ | ∅ | $A_{M,N-2}$ | |
| . | | . | . | . | . | . . | |
| . | . | . | . | . | . | . | |
| . | . | . | . | . | . | . | . |
| $t_M$ | . | | | | | | $A_{M,1}$ |
| . | | | | | | | . |
| . | | | | | | . | |
| $t_N$ | $A_{1,N}$ | | | | | . | |

-continued

| | | | | | | |
|---|---|---|---|---|---|---|
| . | | . | . | . | . | . |
| $t_3$ | $A_{1,3}$ | $\emptyset$ | $A_{2,2}$ | $\emptyset$ | $A_{1,3}$ | |
| $t_2$ | | $A_{1,2}$ | $\emptyset$ | $A_{1,2}$ | | |
| $t_1$ | | | $A_{1,1}$ | | | |

wherein $A_{MN}$ represents a binary word in column N and row M of the first array and t represents units of time.

7. The apparatus of claim 3 wherein the first rearranging and supplying means include first memory means for storing the first array of numbers;

first means for addressing the first memory means so that the rows of the first array of numbers is read out of the first memory means in parallel in accordance with the pattern

| | | | | | | | | |
|---|---|---|---|---|---|---|---|---|
| $t_{M+N-1}$ | | | | | $A_{M,N}$ | | | |
| $t_{M+N-2}$ | | | | $A_{M-1,N}$ | $\emptyset$ | $A_{M,N-1}$ | | |
| $t_{M+N-3}$ | | | $A_{M-2,N}$ | $\emptyset$ | $A_{M-1,N-1}$ | $\emptyset$ | $A_{M,N-2}$ | |
| . | | | . | . | . | . | . | |
| $t_M$ | | | | | | | | $A_{M,1}$ |
| . | | | | | | | | |
| $t_N$ | $A_{1,N}$ | | | | | | | |
| . | | . | . | . | . | . | | |
| $t_3$ | | $A_{1,3}$ | $\emptyset$ | $A_{2,2}$ | $\emptyset$ | $A_{1,3}$ | | |
| $t_2$ | | | $A_{1,2}$ | $\emptyset$ | $A_{1,2}$ | | | |
| $t_1$ | | | | $A_{1,1}$ | | | | |

wherein $A_{MN}$ represents a binary word in column N and row M of the first array and t represents units of time.

8. The apparatus of claim 4 wherein the second array of numbers is a vector of numbers in which each number is in binary form, and further wherein the second rearranging and supply means include buffer means which supply each of the numbers of the vector in bit-parallel form in accordance with the timing sequence

| | |
|---|---|
| $t_N$ | $B_N$ |
| . | . |
| . | . |
| $t_3$ | $B_3$ |
| $t_2$ | $B_2$ |
| $t_1$ | $B_1$ |

wherein $B_N$ represents the binary form of the $N^{th}$ number of the vector and t represents units of time corresponding to the units of time by which the first array is read out of the first memory means.

9. The apparatus of claim 6 wherein the second array of numbers is a vector of numbers in which each number is in binary form, and further wherein the second rearranging and supply means include buffer means which supply each of the numbers of the vector in bit parallel form in accordance with the timing sequence.

| | |
|---|---|
| $t_{-N}$ | $B_1$ |
| $t_{-N+1}$ | $\emptyset$ |
| $t_{-N+2}$ | $B_2$ |
| $t_{-N+3}$ | $\emptyset$ |

-continued

| | |
|---|---|
| . | . |
| $t_{-1}$ | $\emptyset$ |
| $t_\emptyset$ | $B_{\frac{N}{2}+1}$ |
| $t_1$ | $\emptyset$ |
| . | . |
| $t_{N-5}$ | $\emptyset$ |
| $t_{N-4}$ | $B_{N-1}$ |
| $t_{N-3}$ | $\emptyset$ |
| $t_{N-2}$ | $B_N$ |

wherein $B_N$ represents the binary form of the $N^{th}$ number of the vector and t represents units of time corresponding to the units of time by which the first array is read out of the first memory means.

10. The apparatus of claim 1 wherein the numbers of the first and second arrays are in a binary format and further wherein the accumulating means include binary adder means for summing the word products as received from the multiplying means.

11. The apparatus of claim 1 wherein the first and second rearranging and supplying means provide the rearranged arrays to the multiplying means according to the systolic processing format and further wherein the accumulating means comprise outer product addition means responsive to the multiplying means for combining the word products as they emerge from the multiplying means wherein said outer product addition means include a plurality of adders which are each responsive to one of the plurality of signal paths of said multiplying means and which are each coupled to one another, wherein said plurality of adders maintain a summation total and add the word product emerging from each signal path to the summation total, and means for shifting the summation total of each adder into a designated adder prior to receipt of the next word product.

12. The apparatus of claim 2 wherein the multiplying means multiplies optically.

13. The apparatus of claim 12 wherein the optically multiplying means comprises means for generating a collimated beam of light along a beam path;

first spatial light modulating means positioned in the beam path and coupled to the first rearranging and to be supplying means for modulating the light beam along a first dimension in accordance with the binary words from the first rearranging and supplying means;

means receiving the modulated light beam for schlieren imaging the modulated light beam;

second spacial light modulating means coupled to the second rearranging and supplying means and positioned for receiving the schlieren imaged modulated light beam for modulating said schlieren imaged beam along a second dimension transverse to the first dimension in accordance with the binary words from the second rearranging and supplying means;

imaging means responsive to the modulated schlieren imaged beam for imaging said beam along the first dimension to form a plurality of images each corresponding to an element of the output vector, and for imaging each of said plurality of images along the second dimension into a plurality of spatially separated areas;

detector means positioned at said spatially areas for generating a signal representative of the magnitude of light within each of said spacially separated areas;

means for converting said signals into binary form and for shifting and adding said signals.

14. The apparatus of claim 13 wherein the first and second spatial light modulating means are each acousto-optic devices.

15. The apparatus of claim 14 wherein the first spacial light modulating means are constructed of gallum phosphide material and the second spatial light modulating means are constructed of tellurium dioxide material.

16. The apparatus of claim 13 wherein the imaging means include a Fourier transform lens which is positioned to receive the modulated schlieren imaged light beam and transforms said light beam into the frequency domain;

spatial filter means for filtering the transformed light beam;

a reverse Fourier transform means for reverse imaging the filtered transformed light beam; and a one-dimensional, cylindrical Fourier transform lens responsive to the reverse imaged filtered light beam for spatially integrating said light beam in the second dimension.

17. The apparatus of claim 14 wherein the binary words are supplied to the multiplying means at a predetermined order and rate and further wherein the material for the first spatial light modulating means and the second spatial light modulating means are each selected so that the binary words from the first array create an acoustic field in the first spatial light modulator which propagates along the first dimension at a first velocity to modulate the light beam, and the binary words from the second array create an acoustic field in the second spatial light modulator which propagates along the second dimension at a second velocity to modulate the modulated light beam, and wherein the first velocity is related to the second velocity so that the acoustic fields propagate in each device so that the acoustic field in the second spatial light modulator corresponding to a multiplier binary word interacts with the portion of the modulated light beam which was modulated in the first spatial light modulator by the acoustic field corresponding to a multiplicand binary word, wherein the multiplicand and multiplier binary words are those words sought to be multiplied.

18. The apparatus of claim 1 wherein the multiplying means comprises digital means for multiplying binary numbers by analog convolution including a plurality of comparison channels, each channel including a latch having X bit positions for storing the multiplier binary word;

a shift register having X bit positions for receiving and translating the multiplicand binary word through a series of bit translation positions in which bit positions of the shift register are paired with bit positions of the latch;

logic means for comparing the bit positions pairs for each translation position, wherein a logic one signal is generated for each bit position pair in which both have a designated value;

means responsive to the logic means outputs for counting the number of logic ones generated for each comparison;

means for converting the output of the counting means into binary form; and means for shifting and adding the binary form output.

19. An improved apparatus of the type for multiplying a first numerical array by a second numerical array wherein the array multiplication is performed by way of an engagement processing format and the elements of the array are in binnry word form, the improvement comprising:

means supplied with binary words from each array for multiplying the binary words by analog convolution, including means for supplying the binary words from the first numerical array in bit-serial format, and for supplying the binary words from the second numerical array in bit-parallel format;

means for propagating the bit-serial formatted words along a first set of signal paths of the multiplying means and for propagating the bit-parallel words along a second set of signal paths of the multiplying means so that bits from the bit-parallel words are associated with bits of the bit-serial words over time for analog convolution, whereby engagement processing is performed in one dimension represented by one of the sets of signal paths and multiplication by analog convolution is performed in a different dimension represented by the other set of signal paths.

20. An apparatus for multiplying a first numerical array by a second numerical array, wherein the first and second numerical arrays each include a plurality of elements, comprising means for converting each element in the first and second numerical arrays into a representative binary word;

means having an output, a multiplier input and a multiplicand input, for multiplying by analog convolution binary words received at the multiplier input to form product words, wherein the product words are provided at the output, and further wherein the multiplying means comprise an acousto-optic convolving device;

means responsive to the converting means and coupled to the multiplying means for supplying the binary words from the first array to the multiplier input of the multiplying means and for supplying the binary words from the second array to the multiplicand input of the multiplying means, wherein the binary words from each array are supplied in a processing format which is selected from among between an engagement processing format and a systolic processing format; and means coupled to the output of the multiplying menas for accumulating the product words according to the processing format selected in the supplying means.

21. The apparatus of claim 20 wherein the acousto-optic convolving device includes means for generating a light beam;

first acousto-optic light modulating means responsive to the binary words from the multiplicand input for modulating the light beam in accordance with the multiplicand input words to generate a once-modulated light beam;

second acousto-optic light modulating means responsive to the binary words from the multiplier input and to the once-modulated light beam for modulating the once-modulated light beam in accordance with the multiplier input binary words to generate a twice-modulated light beam;

means for convolving the twice-modulated light beam and for converting the convolved, twice modulated light beam into the product word.

22. An apparatus for multiplying a first numerical array by a second numerical array, wherein the first and second numerical arrays each include a plurality of elements, comprising means for converting each element in the first and second numerical arrays into a representative binary word;

means having an output, a multiplier input and a multiplicand input, for multiplying by analog convolution binary words received at the multiplier input to form product words, wherein the product words are provided at the output;

means responsive to the converting means and coupled to the multiplying means for supplying the binary words from the first array to the multiplier input of the multiplying means and for supplying the binary words from the second array to the multiplicand input of the multiplying means, wherein the binary words from each array are supplied in a processing format which is selected from among between an engagement processing format and a systolic processing format, and wherein the binary words supplied to the supplying means are formed into a plurality of serial bit streams; and means coupled to the output of the multiplying means for accumulating the product words according to the processing format selected in the supplying means; and further wherein said binary multiplication by analog convolution means comprise a plurality of data paths, each receiving one of the serial bit streams and including register means having a plurality of bit positions for receiving and storing the binary words from the multipler input;

shift register means having a plurality of bit position for receiving the associated serial bit stream from the multiplicand input and for shifting each binary word therethrough over a plurality of convolution cycles, wherein the position of each binary word therein is shifted one bit position per convolution cycle;

means for comparing corresponding bit positions of the shift register means and the register means during each convolution cycle and for providing a count during each convolution cycle of the number of corresponding bit positions which both have a predesignated logic state; and means for converting the counts for the plurality of convolution cycles into the product word.

23. The apparatus of claim 24 wherein the converting means include

A/D means for converting the count for each convolution cycle into binary form as it is received from the comparing means; and means coupled to the A/D means for accumulating the converted counts, including means for shifting the bit position of each converted count by a shift amount when it is received and before accumulation, wherein the shift amount is incremented with each convolution cycle, so that the accumulated-shifted count at the end of the plurality of convolution cycles represent the product word.

24. The apparatus of claim 21, wherein the convolving and converting means include imaging means for spatially integrating the convolved, twice-modulated light beam;

means for detecting the intensity of the spatially integrated beam, and for transforming the intensity into binary form;

means for shifting and adding the binary form of the spatially integrated beam, wherein each subsequently received binary form is shifted in bit position by a shift amount, said shift amount being increased with each binary form that is received.

25. An optical computing apparatus for multiplying a first array of numbers by a second array of numbers comprising means for supplying a collimated beam of light;

first acousto-optic means positioned to receive the collimated beam and having a plurality of inputs for modulating the collimated beam according to signals applied to the plurality of inputs, wherein said signals generate acoustic fields which propagate in the first acousto-optic means in a direction parallel to a first axis to modulate said collimated beam;

second acousto-optic means positioned to receive the modulated, collimated beam and having a plurality of inputs for modulating the modulated, collimated beam according to signals supplied to the plurality of inputs, wherein said signals generate acoustic fields which propagate in the second acousto-optic means along a second axis transverse to the first axis to further modulate the modulated collimated beam;

means for space integrating the further modulated collimated beam along the second axis;

means for detecting light intensity having an output which is representative thereof;

means for imaging the space integrated beam along the first axis and for directing said imaged, space integrated beam onto the detector means;

means for converting the detecting means output into binary form and for accumulating the converted output, wherein each subsequently received detecting means output is shifted in bit position by a shift amount prior to accumulation, said shift amount being incremented upon the receipt of each detecting means output;

means for rearranging the first and second array of numbers into a format which is selectable between an engagement processing format and a systolic processing format, including means for supplying the words from the rearranged first array to the first acousto-optic means and the words from the rearranged second array to the second acousto-optic means;

means for summing the accumulated outputs into output product form.

26. An optical computing apparatus for multiplying a first array of numbers by a second array of numbers comprising a optical source for providing a collimated light beam;

a first acousto-optic device having multiple electrodes for modulating the collimated light beam according to signals applied to the multiple electrodes, wherein said signals create an acoustic field which propagates in the first device so that the collimated light is modulated over time in accordance therewith;

means for schlieren imaging the modulated light beam;

a second acousto-optic device having multiple electrodes and which receives the schlieren imaged modulated light beam for modulating said modulated light beam in accordance with signals applied to the multiple electrodes wherein said signals create an acoustic field which propagates in the second device over time in a direction transverse to the propagation of the acoustic field in the first device so that the modulated collimated beam is further modulated by the acoustic field of the second device;

means for imaging the space-integrated beam along its x axis onto discrete detectors corresponding to the channels of the device;

means for space integrating the imaged beam along it y axis; and shift and add means for converting the integrated-imaged beam into a binary form which is representative of the product of the matrix vector multiplier.

27. A method for multiplying a first array of numbers by a second array of numbers, wherein the numbers are in binary form, comprising the steps of a. selecting either a systolic or engagement processing format;

b. rearranging the numbers within the first and second arrays according to the selected processing format;

c. associating the numbers of the first and second arrays with one another for multiplication according to the selected processing format; including the steps of i. propagating the rearranged numbers from the first array bit-serially along a first set of data paths;

ii. propagating the rearranged numbers from the second array bit-parallel along a second set of data paths wherein said second set of data paths are coincident with the first set of data paths at selected points therein; and iii. controlling the propagation of the binary numbers along each set of data paths so that the appropriate numbers from each array reach the points of coincidence to achieve the desired association between numbers of the first and second arrays;

d. performing the multiplication of the associated numbers by way of binary multiplication by analog convolution; and e. accumulating the product of each multiplication according to the selected processing format.

28. An apparatus for array multiplication in which a first array of elements is multiplied by a second array of elements to obtain a third array of product-elements, wherein each element in the first and second arrays is in digital form, and further wherein each product-element of the third array represents the sum of number-products, each number-product being formed by multiplying a selected element from the first array with a selected element from the second array, the apparatus comprising first data path means having a plurality of data paths for propagating the elements of the first array at a first propagation rate;

second data path means having a plurality of data paths for propagating the elements of the second array in a bit-parallel format and at a second propagation rate;

means coupled to the data paths of the first and the second data path means for digital multiplication by analog convolution of the digits of the elements present at selected points on the data paths of the first data path means with the digits of the elements then present at selected points on the data paths of the second data path means to form the number-products;

means for supplying the elements of the first array to the first data path means and the elements of the second array to the second data path means in a predetermined format and order so that elements from the first and second array, which are selected to form the number-products, propagate coincident to the corresponding points along their respective data paths so as to be convolved together by the convolving means to form the desired number-products, wherein each element of the second array is supplied to the second data path means in a bit-parallel format; and means for accumulating the number-products from the convolving means to form the product-elements.

29. The apparatus of claim 28 wherein each element from the first array is supplied to a data path in the first data path means in a bit-serial manner, and each element from the second array is supplied to data paths of the second data path means in a bit-parallel manner, and further wherein the first propagation rate is selected with respect to the second propagation rate so that for each number-product the digits of the selected element from the second array are present at the selected points on the data paths of the second data path means throughout a time period during which the digits of the selected element from the first array propagate through the corresponding selected points of the data path of the first data path means, so that each number product is formed by digital multiplication by analog convolution of the digits of the selected elements.

30. The apparatus of claim 29 wherein the supplying means supply the elements of the first and the second arrays to the first and the second data path means in an engagement processing format.

31. The apparatus of claim 29 wherein the supplying means supply the elements of the first and second arrays to the first and the second data path means in a systolic processing format.

32. The apparatus of claim 29 wherein the supplying means include memory means coupled to the first and the second data path means for storing the elements of the first and second array in accordance with the predetermined format so that when the memory means are read out, the elements are output according to the predetermined format.

33. The apparatus of claim 29 wherein the digital multiplication by analog convolution means include means for convolving the digits of the elements corresponding to the number-selected products to form a plurality of convolution terms, wherein the convolution terms are representative of the convolution of the digits of the selected elements for each degree of registration between the elements at the selected points of the data paths as the elements propagate along the data paths; and shift and add means coupled to the convolving means for forming the number-products, wherein for each number-product each convolution term received from the convolving means is shifted by a digit and added to the sum of previous convolution terms which previously have been shifted and added together.

* * * * *